United States Patent
Nishimata

(10) Patent No.: US 10,938,006 B2
(45) Date of Patent: Mar. 2, 2021

(54) CONNECTION MEMBER, ELECTRIC COMPONENT UNIT, AND BATTERY DEVICE

(71) Applicant: DENSO CORPORATION, Kariya (JP)

(72) Inventor: Tatsuki Nishimata, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/300,200

(22) PCT Filed: Oct. 4, 2017

(86) PCT No.: PCT/JP2017/036053
§ 371 (c)(1),
(2) Date: Nov. 9, 2018

(87) PCT Pub. No.: WO2018/070309
PCT Pub. Date: Apr. 19, 2018

(65) Prior Publication Data
US 2019/0173067 A1    Jun. 6, 2019

(30) Foreign Application Priority Data

Oct. 14, 2016  (JP) .............................. JP2016-202939
Sep. 4, 2017   (JP) .............................. JP2017-169810

(51) Int. Cl.
*H01M 2/10*  (2006.01)
*H01R 4/58*  (2006.01)
*H01M 2/20*  (2006.01)

(52) U.S. Cl.
CPC ....... *H01M 2/1083* (2013.01); *H01M 2/1077* (2013.01); *H01M 2/206* (2013.01); *H01R 4/58* (2013.01); *H01M 2220/20* (2013.01)

(58) Field of Classification Search
CPC .. H01M 2/1083; H01M 2/1077; H01M 2/206; H01R 4/58
See application file for complete search history.

(56) References Cited

U.S. PATENT DOCUMENTS

2017/0062780 A1*  3/2017  Bae ....................... H01M 2/206
2017/0062789 A1*  3/2017  Sim ....................... H01M 2/204

FOREIGN PATENT DOCUMENTS

| JP | H07-192827 A | 7/1995 |
| JP | 2016-046167 A | 4/2016 |
| JP | 2018-063922 A | 4/2018 |
| WO | 2018/070310 A1 | 4/2018 |

* cited by examiner

*Primary Examiner* — Edward J. Schmiedel
(74) *Attorney, Agent, or Firm* — Oliff PLC

(57) ABSTRACT

Each of two opposed bus bars includes a main body portion and a connection terminal portion while the connection terminal portion is formed at the main body portion and serves as a portion to be connected to an electric power line portion of a power device. A surface of the main body portion of one of the bus bars is opposed to a surface of the main body portion of the other one of the bus bars, and the other bus bar and the one bus bar are arranged one after the other in a direction perpendicular to the surface of the main body portion. The connection terminal portions of the one bus bar, the connection terminal portions of the other bus bar are arranged one after the other in a direction along the surface of the main body portion.

11 Claims, 13 Drawing Sheets

CONNECTION MEMBER, ELECTRIC COMPONENT UNIT, AND BATTERY DEVICE

CROSS REFERENCE TO RELATED APPLICATION

This application is the U.S. national phase of International Application No. PCT/JP2017/036053 filed on Oct. 4, 2017 and is based on and incorporates herein by reference Japanese Patent Application No. 2016-202939 filed on Oct. 14, 2016 and Japanese Patent Application No. 2017-169810 filed on Sep. 4, 2017.

TECHNICAL FIELD

The present disclosure relates to a connection member, an electric component unit, and a battery device.

BACKGROUND ART

The patent literature 1 discloses a battery unit having a plurality of power devices that control input and output of an electric power relative to an assembled battery. The power devices are connected to bus bars and are electrically coupled to, for example, the assembled battery.

In the battery unit of the patent literature 1, connections of terminals of the power devices relative to the bus bars may be dispersed depending on the locations of the respective power devices. In this case, in a process of connecting between each of the power devices and the corresponding one the bus bars, a tool or a machine needs to be moved and needs to be positioned in place for executing the connecting operation at the connections, so that a relatively large number of steps and labor are disadvantageously required.

CITATION LIST

Patent Literature

PATENT LITERATURE 1: JP2016-46167A

SUMMARY OF INVENTION

It is an objective of the present disclosure to provide a connection member, an electric component unit and a battery device, which enable a reduction in the number of steps and labor required to connect between an electric component and a bus bar.

A connection member of the present disclosure includes a primary bus bar and a secondary bus bar, each of which includes a main body portion and a connection terminal portion while the connection terminal portion is formed at the main body portion and serves as a portion to be connected to a corresponding component-side terminal portion of an electric component. In a state where the primary bus bar and the secondary bus bar are arranged one after another in a perpendicular direction that is perpendicular to a surface of the main body portion of each of the primary bus bar and the secondary bus bar, the connection terminal portion of the primary bus bar and the connection terminal portion of the secondary bus bar are arranged one after another in a crossing direction that crosses the perpendicular direction.

In this connection member, the connection terminal portions of the bus bars are arranged one after the other in the crossing direction that crosses the perpendicular direction, which is perpendicular to the surface of the main body portion. Therefore, at the time of connecting the connection terminal portions to the component-side terminal portions, respectively, the connecting operation can be executed by moving, for example, a tool or a machine in the crossing direction. Thus, it is possible to provide the connection member that can limit the movement of, for example, the tool or the machine, which results in a largely change in the moving direction thereof, thereby enabling the operation of forming the connections between the electric components and the bus bars to be simplified and eased.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Hereinafter, various embodiments of the present disclosure will be described with reference to the accompanying drawings. In each of the following embodiments, portions, which are described in a proceeding embodiment(s), will be indicated by the same reference signs and may not be described further for the sake of simplicity. In each of the following embodiments, in a case where only a portion(s) of the structure is described, the rest of the structure may be the same as the one described in the proceeding embodiment(s). Besides combinations of portions, which are explicitly indicated in each of the embodiments, the portions of different embodiments may be partially combined together even if such a combination is not explicitly described unless there is a problem with respect to such a combination.

First Embodiment

A battery device 10 of the first embodiment will be described with reference to FIGS. 1 to 8. The battery device 10 may be applied to various types of electric apparatuses, each of which has a secondary battery. The various types of electric apparatuses may include, for example: an apparatus, which has a battery; a computer and a vehicle. In the first embodiment, as one such an example, there will be described a case where the battery device 10 is used in a vehicle, such as a hybrid vehicle, which uses a combination of an internal combustion engine and an electric motor powered from a battery as drive sources for driving the hybrid vehicle, or an electric vehicle, which is driven by the electric motor powered from the battery.

Figure 1:
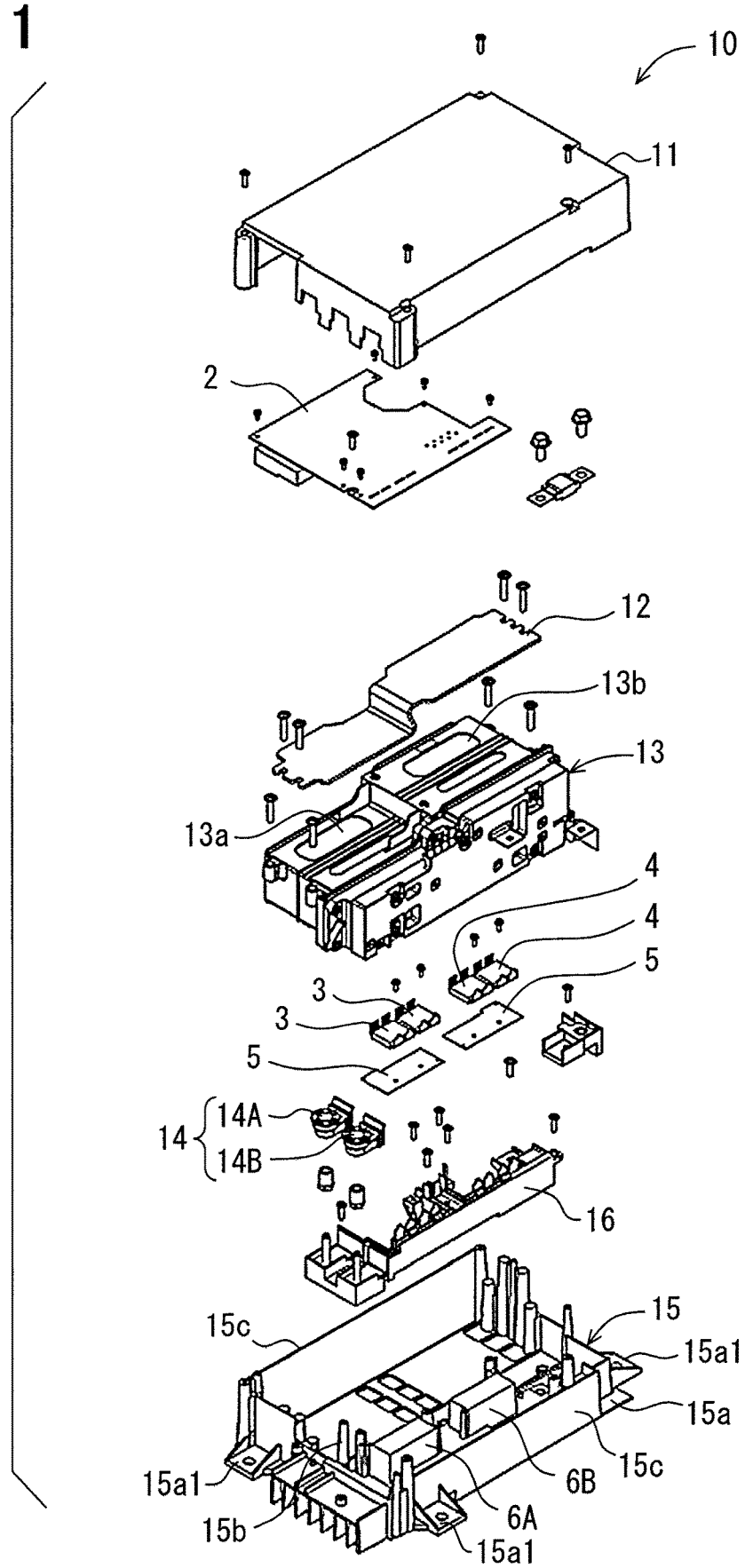
FIG. 1 is an exploded perspective view showing a structure of a battery device according to a first embodiment.

A structure of the battery device 10 will be described with reference to FIG. 1. The battery device 10 includes: an assembled battery 13 that has a plurality of cells that are stacked; a circuit board 2 that executes, for example, a control operation of charging/discharging of the assembled battery 13; a limiting plate 12 that arrests the assembled battery 13 from an upper side of the assembled battery 13; and a case that receives the assembled battery 13. The battery device 10 is placed, for example: under a seat of the vehicle; at a space between a rear seat and a luggage room of the vehicle; or a space between the driver's seat and a front passenger's seat. The case is shaped into a rectangular parallelepiped form and includes: a base case 15 that is fixed to a place where the battery device 10 is mounted; and a cover 11 that is installed to the base case 15 such that the cover 11 covers the base case 15 from an upper side of the base case 15. The base case 15 and the cover 11 are made of metal (e.g., aluminum, copper, an alloy of aluminum or an alloy of copper) or a resin material. In a case where the base case 15 is made of the resin material, it is desirable that a resin material, which has relatively good thermal conductivity, is used, or a material, which has the relatively good thermal conductivity, is mixed in the resin material.

The assembled battery 13 and the circuit board 2 are opposed to each other such that the assembled battery 13 is placed on a lower side of the circuit board 2, and the assembled battery 13 and the circuit board 2 are fixed to the base case 15 by, for examples, screws. The cover 11 is installed to the base case 15 from the upper side of the base case 15, and thereby the assembled battery 13 and the circuit board 2 are received in an inside of the case.

The battery device 10 includes: terminal block units 14, through which input and output of an electric power are executed; and a connector portion, which is electrically connected to, for example, a vehicle ECU. The terminal block units 14 include: a terminal block unit 14A that is used to connect with a Pb battery; and a terminal block unit 14B that is used to connect with an Integrated Starter Generator (ISG). The terminal block unit 14A includes: a first input/output terminal 140 that is connected to an external battery 17 shown in FIG. 2; and a terminal block that supports the first input/output terminal 140. The terminal block unit 14B includes: a second input/output terminal 141 that is connected to a rotary electric machine 19 shown in FIG. 2; and a terminal block that supports the second input/output terminal 141. Each of the terminal blocks is made of a dielectric resin material. The terminal block unit 14A and the terminal block unit 14B are placed side by side, and the terminal blocks of the terminal block unit 14A and the terminal block unit 14B are fixed to the base case 15.

The external battery 17 and an electric load 18 are connected to the first input/output terminal 140 of the terminal block unit 14A through a harness. The rotary electric machine 19 is connected to the second input/output terminal 141 of the terminal block unit 14B through a harness. The rotary electric machine 19 is, for example, a motor generator. A vehicle ECU, which is operable to communicate with a control device 100, is connected to the connector portion. The connector portion is also configured to be connectable with various electric loads that receive an electric power supply from the battery device 10. Each terminal block unit and the connector portion are placed at an outer peripheral portion of the case and are exposed to an outside of the battery device 10.

The base case 15 includes: a base portion 15a; boss portions 15b that project upright from the base portion 15a and are used for fixation; and side wall portions 15c that project upright from the base portion 15a. The base portion 15a is shaped into a rectangular form, and the side wall portions 15c are formed at a peripheral edge part of the base portion 15a. The base portion 15a functions as a battery mounting portion, at which the assembled battery 13 is placed. The circuit board 2 and the limiting plate 12 are fixed, for example, by screws, to upper end parts of the side wall portions 15c and upper end parts of the boss portions 15b. A plurality of attachment portions, which project outward, is formed at an outer peripheral edge of the base portion 15a.

A first cell stack 13a and a second cell stack 13b, which form the assembled battery 13, are arranged one after the other in a predetermined direction on the base portion 15a. In a plan view, the first cell stack 13a and the second cell stack 13b are arranged one after the other in a transverse direction. The circuit board 2 is placed on an upper side of the first cell stack 13a and the second cell stack 13b.

Primary power devices 3 and secondary power devices 4, which are electric power control semiconductor devices, are semiconductor switching devices and are examples of a switch device that controls input and output of the electric power relative to the battery. The switch device is an example of an electric component that is connected to a connection terminal portion of a primary bus bar and a connection terminal portion of a secondary bus bar. Besides the switch devices, the electric components may include components, such as a fuse, a resistor, and a capacitor. An outer cover of each of the primary power devices 3 and the secondary power devices 4 serves as an exterior-cover case for protecting a core arrangement of the device and is made of a material that can release a heat generated therein to the outside. This outer cover is shaped into a flat rectangular parallelepiped form and is made of, for example, resin.

A heat releasing member 6A is formed integrally with the base case 15. The heat releasing member 6A serves as a first heat releasing member that forms a part of a heat releasing path for releasing the heat generated from the primary power devices 3 to the outside. A heat releasing member 6B is formed integrally with the base case 15. The heat releasing member 6B serves as a second heat releasing member that forms a part of a heat releasing path for releasing the heat generated from the secondary power devices 4 to the outside. The heat releasing members 6A, 6B respectively form a part of the base case 15. The heat releasing members 6A, 6B can be formed by, for example, aluminum, copper, an alloy of aluminum or an alloy of copper. The heat releasing members 6A, 6B are opposed to the outer covers of the primary power devices 3 and the outer covers of the secondary power devices 4, respectively, at a location adjacent to the assembled battery 13. The heat releasing members 6A, 6B are arranged next to the assembled battery 13 in the transverse direction. The primary power devices 3 and the secondary power devices 4 are arranged next to the assembled battery 13 in the transverse direction, in which the heat releasing members 6A, 6B are arranged next to the assembled battery 13.

The heat releasing member 6A and the heat releasing member 6B are positioned adjacent to the assembled battery 13, and a planar portion of an upper surface of the heat releasing member 6A and a planar portion of an upper surface of the heat releasing member 6B are opposed to the outer covers of the primary power devices 3 and the outer covers of the secondary power devices 4 through heat conductive members 5. Each of the heat conductive members 5 is a member that has thermal conductivity and dielectricity. A member, which is made of a silicone based material, may be used as the heat conductive member 5. Desirably, the heat conductive member 5 is deformable by an external force to tightly contact the outer cover of each corresponding switch device, which forms an outer surface of the switch device, and the corresponding heat releasing member 6A, 6B. The heat conductive member 5 may be formed by, for example, an elastically deformable sheet, gel, or grease. The heat conductive member 5 enables transfer of the heat between each power device and the corresponding heat releasing member 6A, 6B and electrically insulates between each power device and the corresponding heat releasing member 6A, 6B.

The battery device 10 includes a plurality of attachment portions 15a1 that are provided to the case in a manner that enables transfer of the heat from the heat releasing members 6A, 6B. The heat releasing members 6A, 6B are configured such that the heat is transferable from the heat releasing members 6A, 6B to a vehicle-side member, which is a portion of the vehicle, through the attachment portions 15a1. The attachment portions 15a1 are directly or indirectly attached to the vehicle-side member in a manner that enables release of the heat to the vehicle-side member. Each attachment portion 15a1 is fixed to the vehicle-side member by a fixing means, such a bolt, a screw or welding. The vehicle-side member may be, for example: a frame member that is used to fix a predetermined device to the vehicle; a member that is joined to a chassis; or a member that supports an interior material, which forms a vehicle cabin.

The heat, which is generated at the primary power devices 3, is transferred to the heat releasing member 6A and is thereafter transferred to the base portion 15a. Then, the heat is released to the vehicle-side member through a closest one of the attachment portions 15a1, which is closest to the primary power devices 3. The heat, which is generated at the secondary power devices 4, is transferred to the heat releasing member 6B and is thereafter transferred to the base portion 15a. Then, the heat is released to the vehicle-side member through a closest one of the attachment portions 15a1, which is closest to the secondary power devices 4.

In the case where the battery device 10 is installed such that the assembled battery 13 and the base portion 15a of the base case 15 are arranged one after the other in an up-and-down direction, the plan view of the present description refers to a view of the assembled battery 13 taken downwardly toward the base portion 15a.

The terminal block unit 14A and the terminal block unit 14B are formed integrally with the case and are arranged one after the other in the transverse direction at a location that is closer to the primary power devices 3 in comparison to the secondary power devices 4. Therefore, the terminal block unit 14A and the terminal block unit 14B are provided integrally to the case at the location that is adjacent to the closest one of the attachment portions 15a1, which is closest to the primary power devices 3. The terminal block unit 14A and the terminal block unit 14B may be provided as a portion of the case or may be provided separately from the case and installed to the case, thereby integrated with the case.

The attachment portions 15a1 may be coupled to the vehicle-side member through a bracket. This bracket is a coupling member that is made of a material having thermal conductivity and couples the attachment portions 15a1 to the vehicle-side member. Each of the heat releasing member 6A and the heat releasing member 6B is shaped into a rectangular box form having a hollow interior. The heat, which is generated at each power device, is transferred from the outer cover of the power device to a contact portion of the heat releasing member 6A, 6B, which contacts the outer cover of the power device. Then, the heat is transferred downwardly from the planar portion of the heat releasing member 6A, 6B to side walls of the heat releasing member 6A, 6B. Furthermore, the heat is conducted from a lower end of each side wall of the heat releasing member 6A, 6B to the base portion 15a and is released to the vehicle-side member through the corresponding attachment portion 15a1. The assembled battery 13 does not exist in the heat releasing path of the primary power devices 3 and the heat releasing path of the secondary power devices 4, which are constructed in the above-described manner. Therefore, a malfunctioning of the assembled battery 13 caused by the heat transfer can be limited.

Next, there will be described the positional relationships among the circuit board 2, the heat conductive member 5, the heat releasing member 6A, 6B and the attachment portion 15a1 relative to the power devices as well as the heat releasing paths, which conduct the heat of the power devices to the attachment portions 15a1. The positional relationships of the primary power devices 3 relative to the circuit board 2 and the heat releasing member 6A described below are identical to the positional relationships of the secondary power devices 4 relative to the circuit board 2 and the heat releasing member 6B. Therefore, the signal line portions 41 of each secondary power device 4 correspond to the signal line portions 31 of each primary power device 3, and the electric power line portions 42 of each secondary power device 4 correspond to the electric power line portions 32 of each primary power device 3.

In the battery device 10, the switch devices, such as the primary power devices 3 and the secondary power devices 4, are constructed to be coupled to the circuit board 2 through the signal line portions 31, which do not conduct the electric current for the electric power supply, in a manner that enables communication of a signal. Furthermore, in the respective switch devices, the electric power line portions 32, which conduct the large electric current for the electric power supply, are not connected to the circuit board 2.

Therefore, at the respective switch devices, the large electric current, which flows in a device main body and the electric power line portions 32, is not conducted to the circuit board 2.

At a location spaced from the circuit board 2, each primary power device 3 is oriented such that a thickness direction of the primary power device 3 is perpendicular to a surface of the circuit board 2, which forms the primary plane of the circuit board 2, and the primary power device 3 indirectly contacts the heat releasing member 6A through the heat conductive member 5. Therefore, the primary power device 3 and the heat releasing member 6A are arranged next to the assembled battery 13 in the transverse direction and are placed adjacent to the assembled battery 13. In the primary power device 3, a projecting direction of the signal line portions 31 from the outer cover and a projecting direction of the electric power line portions 32 from the outer cover are along the primary plane of the circuit board 2. The primary power device 3 is arranged such that a direction of a width of the primary power device 3, which is a length measured between a projecting end part of the signal line portion 31 and a projecting end part of the electric power line portion 32, is along the primary plane of the circuit board 2. The primary power device 3 is shaped into a planar form such that the width of the outer cover is larger than a thickness of the outer cover.

Figure 3:
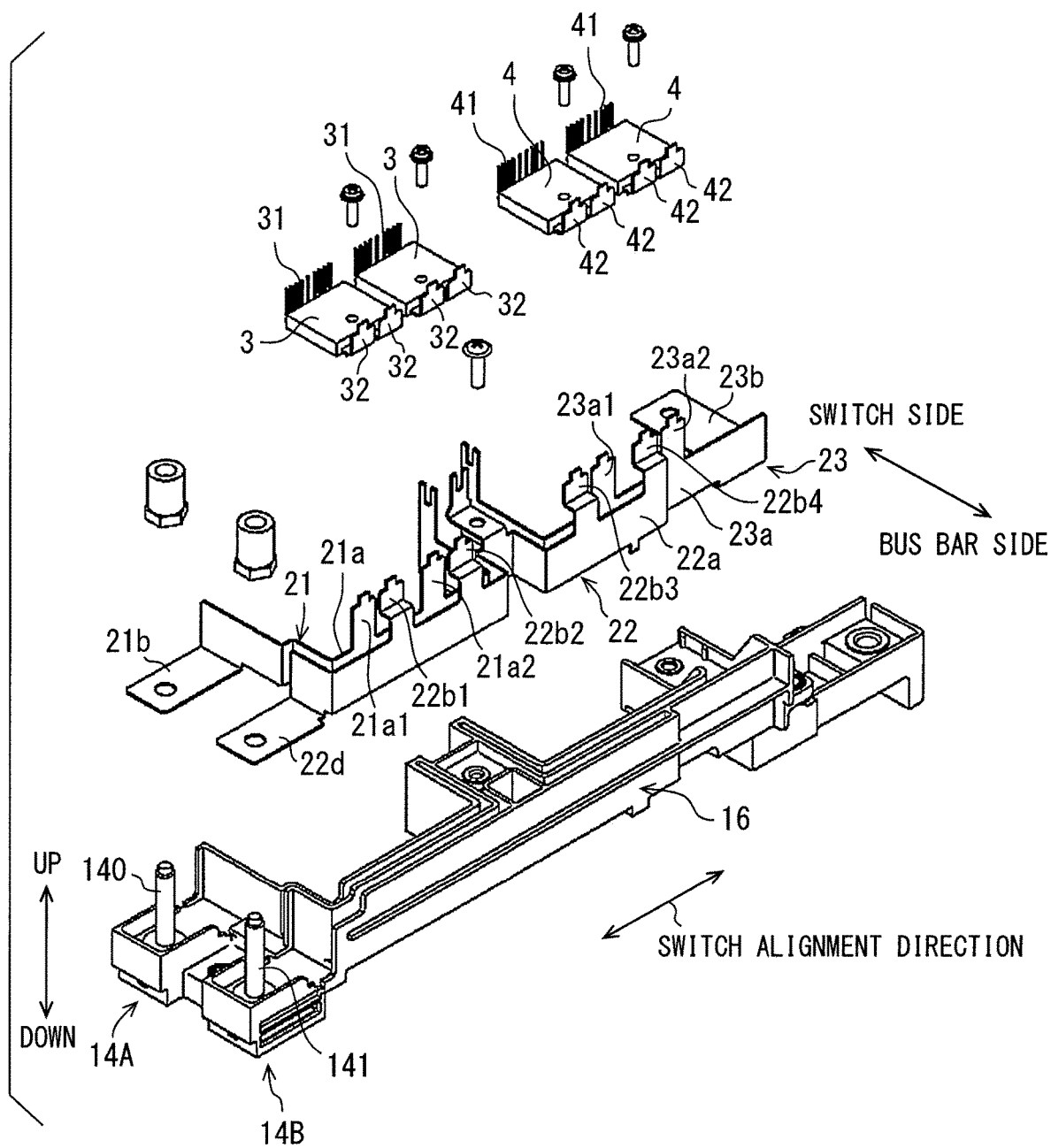
FIG. 3 is an exploded perspective view showing a relationship between each of power devices and corresponding ones of bus bars at the battery device of the first embodiment.
Figure 4:
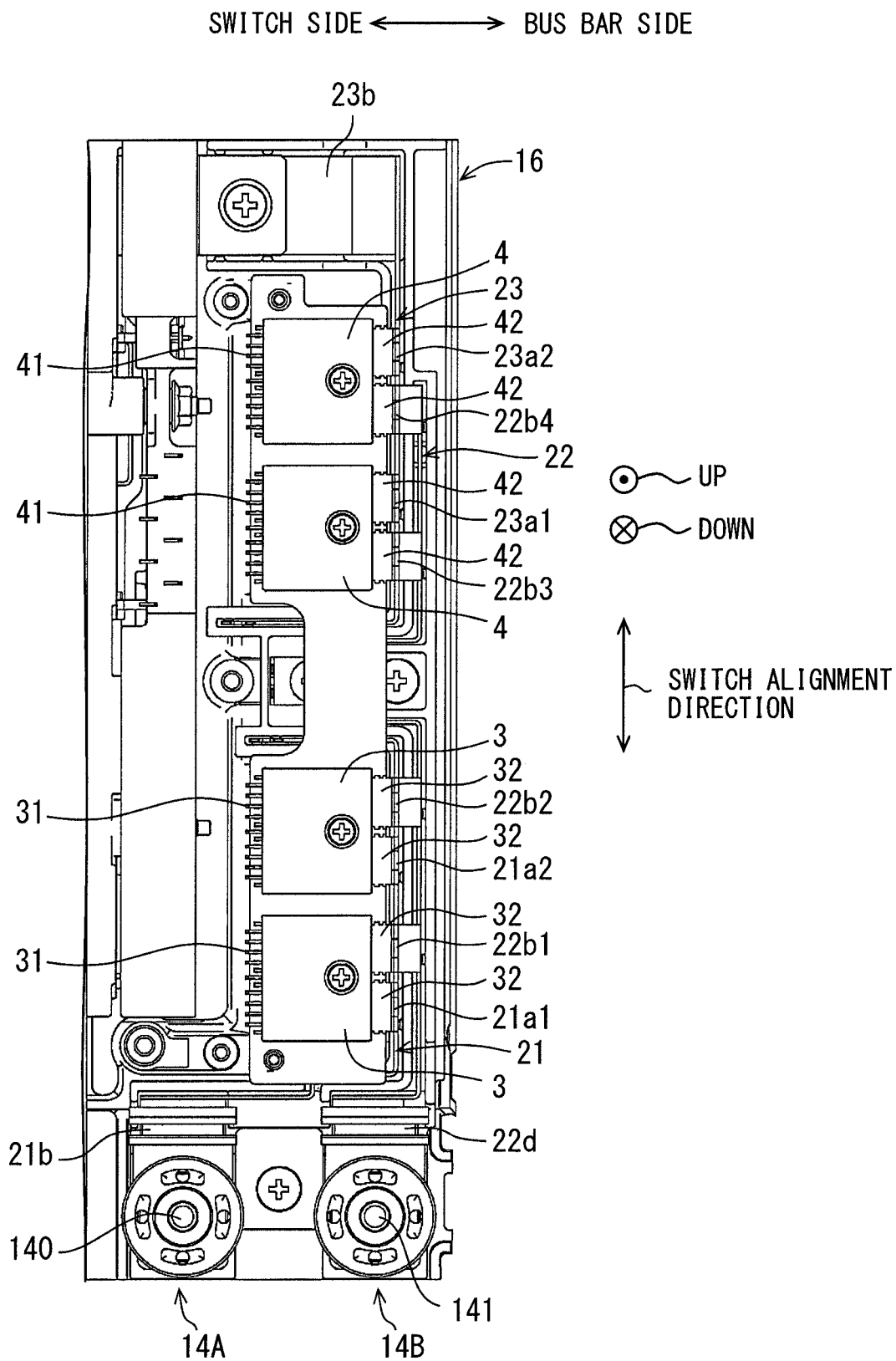
FIG. 4 is a partial plan view showing the relationship between each of the power devices and the corresponding ones of the bus bars at the battery device of the first embodiment.
Figure 5:
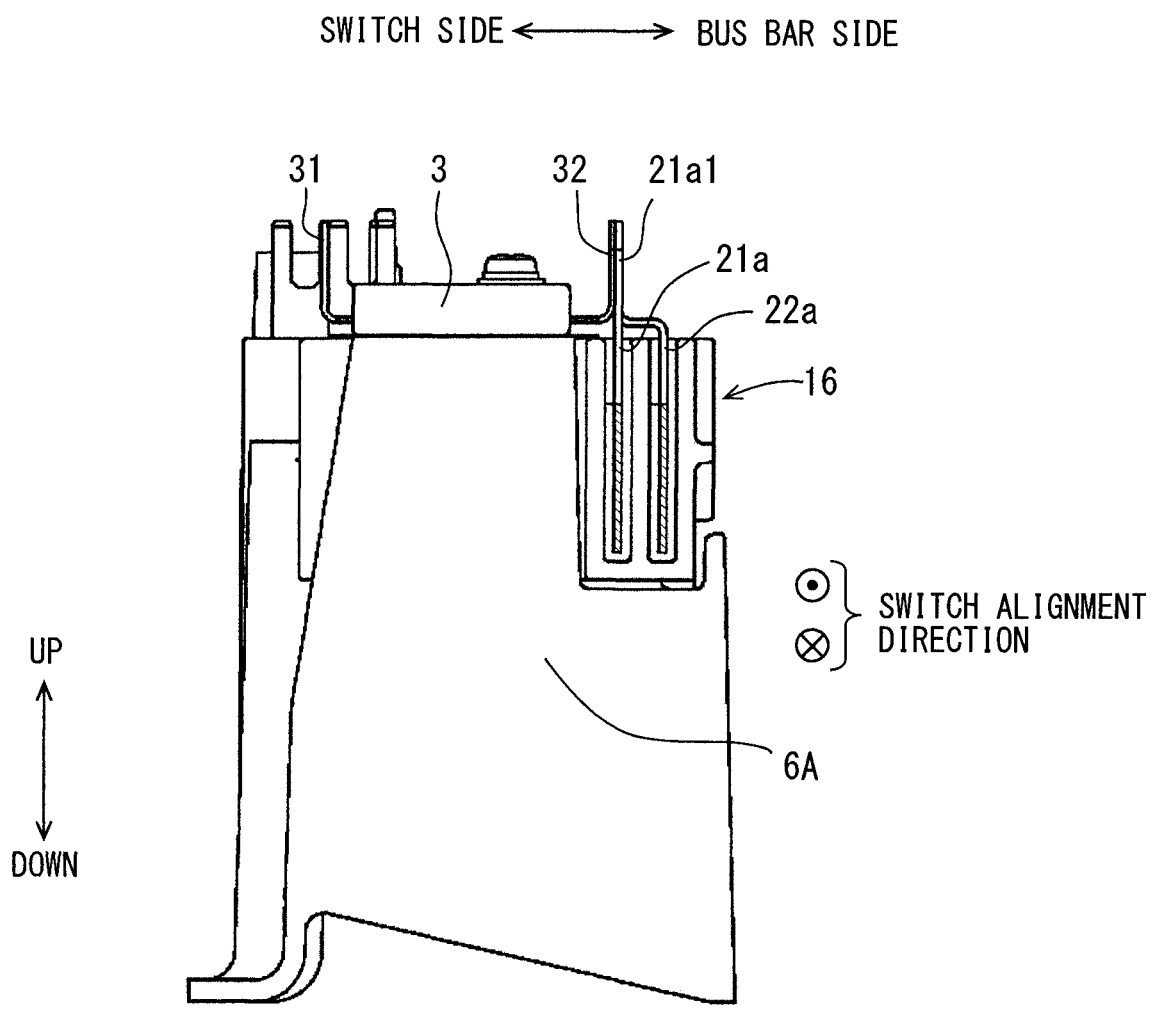
FIG. 5 is a partially fragmented side view showing a relationship between the power device and the corresponding ones of the bus bars at the battery device of the first embodiment.

The signal line portions 31 project from the outer cover in the transverse direction and are bent in a direction perpendicular to the primary plane of the circuit board 2, and thereby the signal line portions 31 are connected to the circuit board 2 or connected to an electric component(s) installed to the circuit board 2. The electric power line portions 32 are not connected to the circuit board 2 and serve as component-side terminal portions that are electrically conductive and are respectively coupled to the first input/output terminal 140 or the second input/output terminal 141 through the corresponding bus bar 21, 22, 23. The electric power line portions 32 are the component-side terminal portions that are electrically conductive and are respectively joined to the corresponding bus bar 21, 22, 23 by, for example, welding. As shown in FIGS. 3 and 4, the bus bar 21, the bus bar 22 and the bus bar 23 are conductive members that are made of copper and are supported by a bus bar support member 16 that is received in the base case 15 along with the assembled battery 13. Each bus bar is a plate member that is electrically conductive and is connected to the first input/output terminal 140 or the second input/output terminal 141. The bus bar support member 16 is a bus bar receiving case that receives the bus bar 21, the bus bar 22 and the bus bar 23 in a stable state. The bus bar support member 16 is made of a dielectric material and electrically insulates each bus bar from members that are located around the bus bar support member 16.

The connecting portion of each heat releasing member 6A, 6B, which is thermally connected to the corresponding power devices, includes a surface that extends in the transverse direction. Furthermore, the outer cover of each power device may be configured to directly contact the heat releasing member 6A, 6B without the heat conductive member 5. A fixing means for fixing the primary power device 3 to the heat conductive member 5 and the heat releasing member 6A may be a dielectric bonding agent (e.g., silicone based bonding agent), a bolt or a screw. The heat releasing member 6A, 6B is arranged such that the heat can be transferred to the base portion 15a of the base case 15, which receives the assembled battery 13. With the above construction, the heat, which is transferred from the outer covers of the corresponding power devices to each heat releasing member 6A, 6B through the heat conductive member 5, is transferred to the base portion 15a, and thereafter the heat is released through the heat releasing path that transfers the heat to the vehicle-side member through the attachment portion 15a1.

The control device 100 is a device that manages at least the amount of electricity stored in the assembled battery 13, and the control device 100 may be a battery management unit (BMU). Further, the battery management unit may be a device, which monitors the electric current, the voltage, and the temperature of the assembled battery 13 and manages, for example, abnormality of cells and leakage abnormality. The battery management unit is operable to communicate with various electronic control devices installed to the vehicle. The battery management unit may receive a signal indicating an electric current value measured with an electric current sensor or may be a control device that controls an operation of a main relay and an operation of a pre-charge relay. The battery management unit may function as a device that controls an operation of an electric motor of a blower device, which drives cooling fluid to cool the heat generating devices, such as the cells. The battery management unit is operable to communicate with the various electronic control devices (e.g., a vehicle ECU), which are installed to the vehicle.

Figure 2:
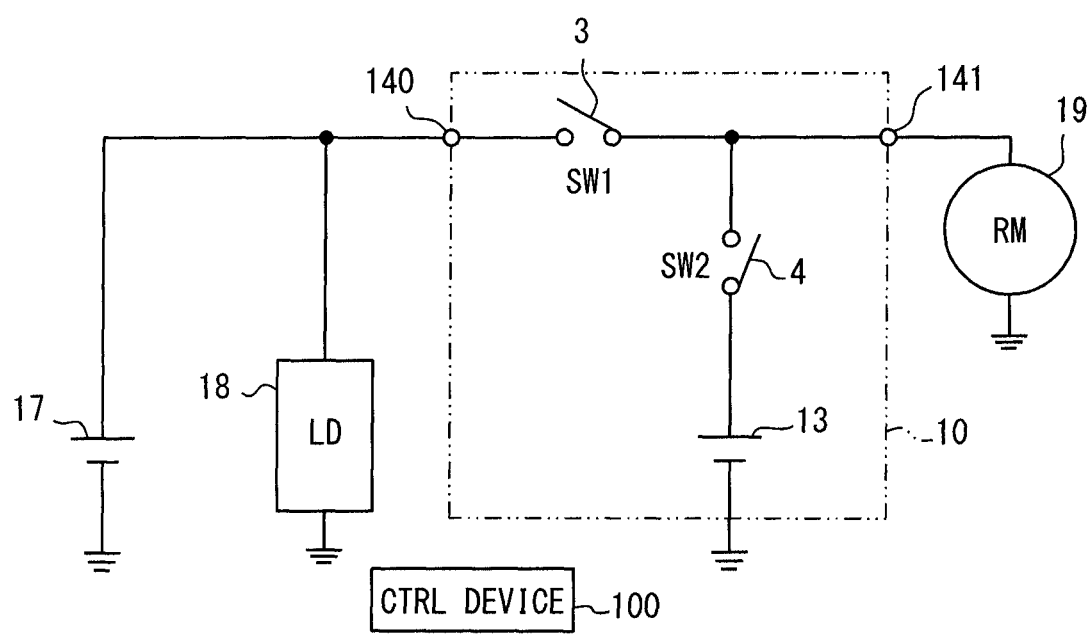
FIG. 2 is a circuit diagram for the battery device of the first embodiment.

As shown in FIG. 2, the circuit, which is associated with the battery device 10, includes the external battery 17, the assembled battery 13, the electric load 18, the rotary electric machine 19, the primary power devices 3, the secondary power devices 4 and the control device 100. The assembled battery 13 is an internal battery that is installed in an inside of the case, which receives the battery device 10. The assembled battery 13 is formed by, for example, a lithium ion secondary battery. The assembled battery 13 is preferably a secondary battery having low resistance and excellent regenerative performance. The external battery 17 is a secondary battery that is placed at an outside of a case, which receives the battery device 10. The external battery 17 may be, for example, a lead-acid battery. It is preferable that the external battery 17 is installed at a different location apart from the internal battery and is a large capacity secondary battery.

The assembled battery 13 includes the plurality of cells, which are connected, for example, in series, and these cells are placed in a predetermined configuration and are integrally received in the case. In the present embodiment, as shown in FIG. 1, the first cell stack 13a, which includes two cells stacked in the up-and-down direction, and the second cell stack 13b, which includes three cells stacked in the up-and-down direction, are arranged side-by-side in two rows. Each of the five cells is a lithium ion secondary battery that is shaped into a thin rectangular parallelepiped form, and the cell is oriented such that a thickness direction of the cell coincides with the up-and-down direction. In each cell stack, all of the cells are connected in series and are thereby connected in a manner that enables conduction of the electric current therethrough. All of the cell stacks are connected in a manner that enables conduction of the electric current therethrough, so that the cell stacks function as the assembled battery 13 of the battery device 10.

The constituent components of the control device 100 are installed to the circuit board 2. The circuit board 2 is also referred to as a BMU circuit board that functions as the battery management unit. The control device 100 executes turning on (closing) and turning off (opening) of each switch that is the power device described above, and thereby the control device 100 controls charging/discharging of each of the external battery 17 and the assembled battery 13.

The battery device 10 includes the first input/output terminal 140 and the second input/output terminal 141, which are provided as external terminals. The external battery 17 and the electric load 18 are connected in parallel to the first input/output terminal 140, and the primary power devices 3 are connected to an opposite side of the first input/output terminal 140, which is opposite from the external battery 17. Furthermore, the second input/output terminal 141 is connected in series to the primary power devices 3. The secondary power devices 4 are connected in series to the assembled battery 13. The primary power devices 3 and the secondary power devices 4 are connected in parallel to the second input/output terminal 141. In other words, the second input/output terminal 141 is connected to a connection between the path, which includes the primary power devices 3, and the path, which includes the secondary power devices 4. The external battery 17 is connected to the electric load 18 in a manner that enables supply of the electric power to the electric load 18. The electric load 18 is an ordinary electric load, which is other than an electric load that requires a constant voltage. The electric load 18 may be, for example, a headlight, a wiper device of, for example, a front windshield, a blower fan of an air conditioning apparatus, a defrost heater of a rear windshield.

The rotary electric machine 19 is connected to an opposite side of the second input/output terminal 141, which is opposite from the power devices. Therefore, the primary power devices 3 and the secondary power devices 4 are connected in parallel to the rotary electric machine 19. The primary power devices 3, which are primary switch devices, are operable to switch between an enabled state, in which the electric current can be conducted between the rotary electric machine 19 and each of the external battery 17 and the electric load 18 through the primary power devices 3, and a disabled state, in which the electric current cannot be conducted between the rotary electric machine 19 and each of the external battery 17 and the electric load 18 through the primary power devices 3. The secondary power devices 4, which are secondary switch devices, are operable to switch between an enabled state, in which the electric current can be conducted between the assembled battery 13 and the rotary electric machine 19 through the secondary power devices 4, and a disabled state, in which the electric current cannot be conducted between the assembled battery 13 and the rotary electric machine 19 through the secondary power devices 4.

The rotary electric machine 19 has: an electric power generating function for generating electric power through rotation of a crankshaft of the engine, i.e., for executing regenerative power generation; and a drive force outputting function for applying a rotational force to the crankshaft. The rotary electric machine 19 forms an integrated starter generator (ISG). The external battery 17 and the assembled battery 13 are electrically connected in parallel to the rotary electric machine 19. When the primary power devices 3 are turned on, the external battery 17 is placed in a state where the electric power can be supplied from the rotary electric machine 19 to the external battery 17, so that the external battery 17 can be charged with the regenerative electric power supplied from the rotary electric machine 19. When the secondary power devices 4 are turned on, the assembled battery 13 is placed in a state where the electric power can be supplied from the rotary electric machine 19 to the assembled battery 13, so that the assembled battery 13 can be charged with the regenerative electric power supplied from the rotary electric machine 19. Therefore, the primary power devices 3 and the secondary power devices 4 form portions of a large electric current path, in which a relatively large electric current may flow between the rotary electric machine 19 and each battery.

Next, structures of the bus bars 21, 22, 23 and a relationship between each bus bar 21, 22, 23 and the corresponding power devices 3, 4 will be described with reference to FIGS. 3 and 4. Each bus bar is a plate member having electric conductivity and is connected to the electric power line portions 32, 42 of the corresponding power devices 3, 4 to conduct the large electric current for the electric power supply. The bus bar 21 and the bus bar 23 are received in the bus bar support member 16 in a state where the bus bar 21 and the bus bar 23 are placed one after the other in a switch alignment direction that is defined as a direction along which the power devices are arranged one after the other. The bus bar 22 is placed on an opposite side of the bus bar 21 and the bus bar 23, which is opposite from the power devices. The bus bar 22 is placed on "a bus bar side" of the bus bar 21 shown in FIG. 4 and the bus bar 23, i.e., is placed on a side of the bus bar 21 and the bus bar 23, which is opposite from the switch devices, to overlap with the bus bar 21 and the bus bar 23.

The bus bar 21 includes: a main body portion 21*a*, which is elongated in the switch device alignment direction; a plurality of connection terminal portions 21*a*1, 21*a*2, which project from the main body portion 21*a*; and a large-current terminal portion 21*b*, which is formed at one end of the main body portion 21*a*. An extending direction of the main body portion 21*a* coincides with the switch device alignment direction (also referred to as a switch alignment direction), along which the switch devices are arranged one after the other. Each of the connection terminal portions of the bus bar 21 is a portion located on a distal end side of a corresponding leg portion that outwardly projects from a corresponding predetermined location along an outer edge of the main body portion 21*a*, which is shaped into the rectangular plate form. The number of the connection terminal portions and the number of the leg portions of the bus bar 21 correspond to the number of electric power terminal portions of the switch devices to be connected with the bus bar 21. A projecting direction, a shape, a bending angle, the number of times of bending of each leg portion of the bus bar 21 are set depending on the locations of the electric power terminal portions to be connected with the bus bar 21.

The large-current terminal portion 21*b* at the one end of the main body portion 21*a* is connected to the first input/output terminal 140 to conduct the large electric current. The large-current terminal portion 21*b* is an electric current terminal portion, through which the electric current is inputted or outputted relative to the main body portion 21*a*. The connection terminal portion 21*a*1 and the connection terminal portion 21*a*2 are respectively formed as upwardly projecting rectangular portions that are arranged one after the other and are spaced from each other in the switch alignment direction. Furthermore, the connection terminal portion 21*a*1 and the connection terminal portion 21*a*2 are aligned in the alignment direction of the switch devices and the alignment direction of the bus bars. In other words, the position of the connection terminal portion 21*a*1 and the position of the connection terminal portion 21*a*2 coincide with each other in the direction that is perpendicular to both of the up-and-down direction and the switch alignment direction. The connection terminal portion 21*a*1 is a terminal portion that is connected to the electric power line portion 32 of the corresponding primary power device 3, which is closest to the large-current terminal portion 21*b* among the primary power devices 3. The connection terminal portion 21*a*2 is a terminal portion that is connected to the electric power line portion 32 of the other primary power device 3, which is the second closest to the large-current terminal portion 21*b* among the primary power devices 3.

The bus bar 23 includes: a main body portion 23*a*, which is elongated in the switch alignment direction; a plurality of connection terminal portions 23*a*1, 23*a*2, which project from the main body portion 23*a*; and a large-current terminal portion 23*b*, which is formed at the other end of the main body portion 23*a*. An extending direction of the main body portion 23*a* coincides with the switch alignment direction, in which the switch devices are arranged one after the other. Each of the connection terminal portions of the bus bar 23 is a portion located on a distal end side of a corresponding leg portion that outwardly projects from a corresponding predetermined location along an outer edge of the main body portion 23*a*, which is shaped into the rectangular plate form. The number of the connection terminal portions and the number of the leg portions of the bus bar 23 correspond to the number of electric power terminal portions of the switch devices to be connected with the bus bar 23. A projecting direction, a shape, a bending angle, the number of times of bending of each leg portion of the bus bar 23 are set depending on the locations of the electric power terminal portions to be connected with the bus bar 23.

The large-current terminal portion 23*b* at the other end of the main body portion 23*a* is connected to an input/output terminal connected to the assembled battery 13 to conduct the large electric current. The connection terminal portion 23*a*1 and the connection terminal portion 23*a*2 are respectively formed as upwardly projecting rectangular portions that are arranged one after the other and are spaced from each other in the switch alignment direction. Furthermore, the connection terminal portion 23*a*1 and the connection terminal portion 23*a*2 are aligned in the alignment direction of the switch devices and the alignment direction of the bus bars. In other words, the position of the connection terminal portion 23*a*1 and the position of the connection terminal portion 23*a*2 coincide with each other in the direction that is perpendicular to both of the up-and-down direction and the switch alignment direction. The connection terminal portion 23*a*2 is a terminal portion that is connected to the electric power line portion 42 of the corresponding secondary power device 4, which is closest to the large-current terminal portion 23*b* among the secondary power devices 4. The connection terminal portion 23*a*2 is a terminal portion that is connected to the electric power line portion 42 of the secondary power device 4, which is the second closest to the large-current terminal portion 23*b* among the secondary power devices 4.

The bus bar 22 includes: a main body portion 22*a*, which is elongated in the switch alignment direction; a plurality of connection terminal portions 22*b*1, 22*b*2, 22*b*3, 22*b*4, which project from the main body portion 22*a*; and a large-current terminal portion 22*d*, which is formed at one end of the main body portion 22*a*. An extending direction of the main body portion 22*a* coincides with the switch alignment direction, in which the switch devices are arranged one after the other. The main body portion 21*a* of the bus bar 21 and the main body portion 22*a* of the bus bar 22 are arranged one after the other and are spaced from each other in the plate thickness direction of the bus bar 21, 22. The main body portion 22*a* of the bus bar 22 and the main body portion 23*a* of the bus bar 23 are arranged one after the other and are spaced from each other in the plate thickness direction of the bus bar 22, 23. Each of the connection terminal portions of the bus bar 22 is a portion located on a distal end side of a corresponding leg portion that outwardly projects from a corresponding predetermined location along an outer edge of the main body portion 22*a*, which is shaped into the rectangular plate form. The number of the connection terminal portions and the number of the leg portions of the bus bar 22 correspond to the number of electric power terminal portions of the switch devices to be connected with the bus bar 22. A projecting direction, a shape, a bending angle, the number of times of bending of each leg portion of the bus bar 22 are set depending on the locations of the corresponding electric power terminal portions to be connected with the bus bar 22.

The large-current terminal portion 22*d* at one end of the main body portion 22*a* is connected to the second input/output terminal 141 to conduct the large electric current. The large-current terminal portion 22*d* is an electric current terminal portion, through which the electric current is inputted or outputted relative to the main body portion 22*a*. The connection terminal portion 22*b*1 and the connection terminal portion 22*b*2 are portions located on a distal end side of corresponding upwardly projecting bent leg portions, which are placed at corresponding locations that correspond to the primary power devices 3 such that the leg portions are arranged one after the other and are spaced from each other in the switch alignment direction. Furthermore, the connection terminal portion 22*b*1 and the connection terminal portion 22*b*2 are aligned in the alignment direction of the switch devices and the alignment direction of the bus bars. In other words, the position of the connection terminal portion 22*b*1 and the position of the connection terminal portions 22*b*2 coincide with each other in the direction that is perpendicular to both of the up-and-down direction and the switch alignment direction. The connection terminal portion 22*b*1 is a terminal portion that is connected to the electric power line portion 32 of the corresponding primary power device 3, which is closest to the large-current terminal portion 22*d* among the primary power devices 3. The connection terminal portion 22*b*2 is a terminal portion that is connected to the electric power line portion 32 of the other primary power device 3, which is the second closest to the large-current terminal portion 22*d* among the primary power devices 3.

The connection terminal portion 22*b*3 and the connection terminal portion 22*b*4 are portions located on a distal end side of corresponding upwardly projecting bent leg portions, which are placed at corresponding locations that correspond to the secondary power devices 4 such that the leg portions are arranged one after the other and are spaced from each other in the switch alignment direction. Furthermore, the connection terminal portion 22*b*3 and the connection terminal portion 22*b*4 are aligned in the alignment direction of the switch devices and the alignment direction of the bus bars. In other words, the position of the connection terminal portion 22*b*3 and the position of the connection terminal portions 22*b*4 coincide with each other in the direction that is perpendicular to both of the up-and-down direction and the switch alignment direction. The connection terminal portion 22*b*4 is a terminal portion that is connected to the electric power line portion 42 of the corresponding secondary power device 4, which is closest to the large-current terminal portion 23*b* among the secondary power devices 4. The connection terminal portion 22*b*4 is a terminal portion that is connected to the electric power line portion 42 of the other secondary power device 4, which is the second closest to the large-current terminal portion 23*b* among the secondary power devices 4.

The connection terminal portions of the bus bar 21, the bus bar 22 and the bus bar 23 are the portions that are connected to the electric power line portions 32, 42, which are the component-side terminal portions of the switch devices. The bus bar 21 and the bus bar 22 are arranged such that a surface of the main body portion 21a of the bus bar 21 and a surface of the main body portion 22a of the bus bar 22 are opposed to each other, and the bus bars 21, 22 are arranged one after the other in a perpendicular direction that is perpendicular to the surface of the main body portion 21a, 22a of each of the bus bars 21, 22. The bus bar 22 and the bus bar 23 are arranged such that a surface of the main body portion 22a of the bus bar 22 and a surface of the main body portion 23a of the bus bar 23 are opposed to each other, and the bus bars 22, 23 are arranged one after the other in a perpendicular direction that is perpendicular to the surface of the main body portion 21a, 22a of each of the bus bars 22, 23. This perpendicular direction is also a direction along which the power devices and the bus bars are arranged one after the other. The bus bar 21 and the bus bar 23 are arranged one after another in a direction along the surface of the main body portion of each of the bus bars 21, 23. The main body portion 21a of the bus bar 21 and the main body portion 23a of the bus bar 23 are arranged one after the other in the direction along the surface of the main body portion 21a, 23a of each of the bus bars 21, 23. Examples of the combination of the primary bus bar and the secondary bus bar according to the present disclosure include a combination of the bus bar 21 and the bus bar 22, a combination of the bus bar 23 and the bus bar 22, and a combination of the bus bar 21, the bus bar 22 and the bus bar 23.

The connection member associated with the switch devices, each of which is an example of the electric component of the battery device 10, includes: the bus bar 22; and the bus bar 21 or the bus bar 23. In the example shown in FIGS. 6 to 8, the connection terminal portions will be described with respect to the bus bar 21 and the bus bar 22, which are arranged one after the other in the perpendicular direction that is perpendicular to the surface of the main body portion of each of the bus bar 21 and the bus bar 22. The connection terminal portions 21a1, 21a2 of the bus bar 21 and the connection terminal portions 22b1, 22b2 of the bus bar 22 are arranged one after the other in the direction along the surface of the main body portion 21a, 22a or the switch alignment direction. The connection terminal portions of the primary bus bar and the connection terminal portions of the secondary bus bar may be arranged one after the other in a crossing direction that crosses the perpendicular direction that is perpendicular to the surface of the main body portion of the bus bar.

An electric component unit of the battery device 10 includes: the connection member and the plurality of electric components, each of which includes the component-side terminal portions respectively connected to the corresponding connection terminal portions. The electric component unit may include the bus bar receiving case that receives the primary bus bar and the secondary bus bar such that the primary bus bar and the secondary bus bar are arranged one after the other in the perpendicular direction that is perpendicular to the surface of the main body portion of each of the primary bus bar and the secondary bus bar. When the electric component unit includes the bus bar receiving case, the primary bus bar and the secondary bus bar can be respectively held at desirable locations. Therefore, the connection terminal portions of the primary bus bar and the connection terminal portions of the secondary bus bar, which will be respectively connected to the component-side terminal portions, can be arranged one after another in the crossing direction that crosses the perpendicular direction.

Figure 7:
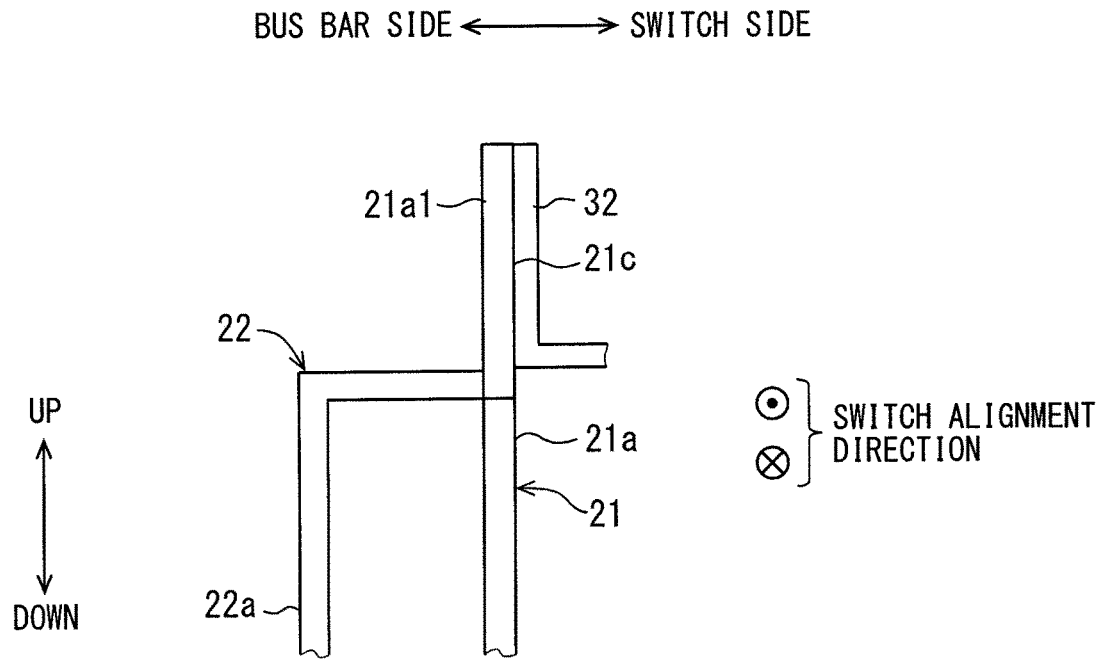
FIG. 7 is a side view showing the bus bars of the first embodiment.
Figure 8:
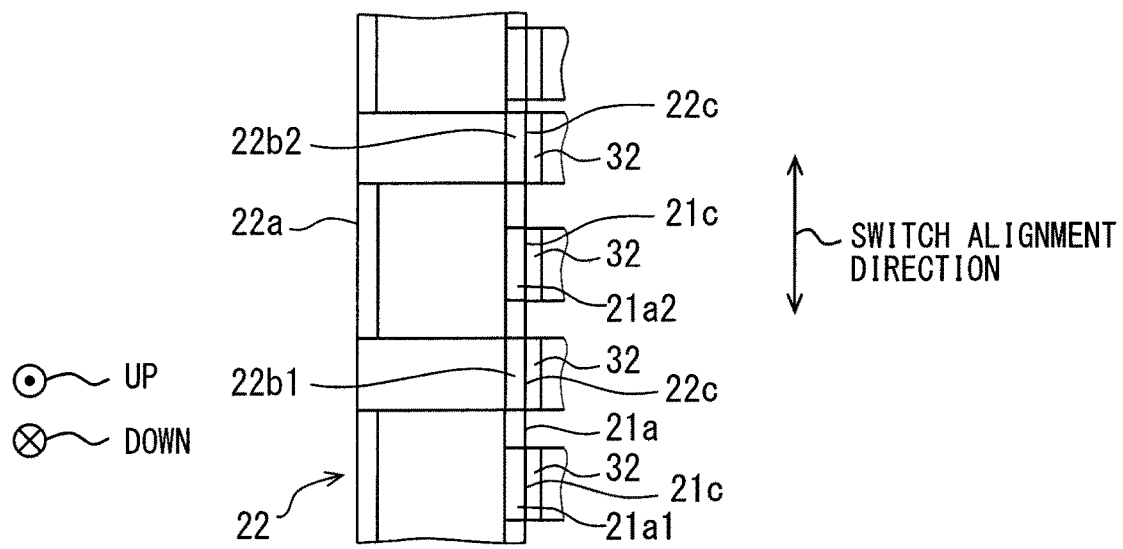
FIG. 8 is a plan view showing the bus bars of the first embodiment.

As shown in FIGS. 7 and 8, the connection terminal portion 22b1 and the connection terminal portion 22b2 of the bus bar 22 are the portions located on the distal end side of the bent leg portions, which project from the main body portion 22a toward the bus bar 21 and are bent at the midway. A connecting part of the connection terminal portion 22b1 and a connecting part of the connection terminal portion 22b2, which are respectively connected to the corresponding component-side terminal portions, respectively form connection surfaces 22c, which are parallel to connection surfaces 21c of the connection terminal portion 21a1 and the connection terminal portion 21a2 of the bus bar 21. The connection terminal portion 21a1 and the connection terminal portion 21a2 are configured to upwardly project from an upper end part of the main body portion 21a, and a connecting part of the connection terminal portion 21a1 and a connecting part of the connection terminal portion 21a2, which are respectively connected to the component-side terminal portions, respectively form the connection surfaces 21c, respectively, which extend along the surface of the main body portion. A position of the connection surface 22c of each of the connection terminal portion 22b1 and the connection terminal portion 22b2 coincides with a position of the connection surface 21c of each of the connection terminal portion 21a1 and the connection terminal portion 21a2 in the perpendicular direction that is perpendicular to the surface of the main body portion 22a.

Therefore, the connection terminal portion 22b1 and the connection terminal portion 22b2 are provided at the position that coincides with the position of the main body portion 21a and the connection terminal portions 21a1, 21a2 of the bus bar 21 in the perpendicular direction. As discussed above, the connection terminal portion 22b1 and the connection terminal portion 22b2 largely project beyond the main body portion 22a toward the switch side to meet the component-side terminal portions. Here, as an another example, which is different form the example shown in FIGS. 6 to 8, the bus bar 21 and the bus bar 22 may be switched each other such that the connection terminal portions 21a1 and the connection terminal portion 21a2 largely project beyond the main body portion 21a toward the switch side to meet the component-side terminal portions.

Next, the advantages, which can be achieved with the first embodiment, will be described. The connection member of the battery device 10 form the primary bus bar(s) and the secondary bus bar by any one of: the combination of the bus bar 21 and the bus bar 22; the combination of the bus bar 23 and the bus bar 22; and the combination of the bus bar 21, the bus bar 22 and the bus bar 23. In the state where the bus bars, which respectively serve as the primary bus bar and the secondary bus bar, are arranged one after the other in the perpendicular direction that is perpendicular to the surface of the main body portion of each of the bus bars, the connection terminal portions of the bus bars, which respectively serve as the primary bus bar and the secondary bus bar, are arranged one after the other in the crossing direction that crosses the perpendicular direction. In the bus bars that have the main body portions, respectively, which are opposed to each other, the leg portions (in other words, extending portions), each of which connects between the corresponding main body portion and the corresponding connection terminal portion, are configured such that the leg portions of each of the bus bars project toward the connection terminal portions of the other one of the bus bars. Thereby, this arrangement contributes to that the connection terminal portions of the bus bars are arranged one after the other in the crossing direction.

In the connection member, the connection terminal portions of the bus bars are arranged one after the other in the direction along the surface of the main body portion or the crossing direction. Therefore, at the time of connecting the connection terminal portions to the electric power line portions 32, 42, respectively, the connecting operation can be executed by moving, for example, a tool or a machine in a single direction. Therefore, the connecting operation can be executed without substantially changing the moving direction in the middle of the connecting operation. Thus, with this connection member described above, the connecting operation can be simplified. Thereby, the connections between each switch device (the example of the electric device) and the corresponding bus bars can be easily formed.

The connection terminal portions of the primary bus bar and the connection terminal portions of the secondary bus bar are arranged one after the other in the direction along the surface of the main body portion. In the bus bars that respectively have the main body portions opposed to each other, the leg portions (in other words, the extending portions), each of which connects between the corresponding main body portion and the corresponding connection terminal portion, are configured such that the leg portions of the one of the bus bars projects toward the connection terminal portions of the other one of the bus bars. Thereby, this arrangement contributes to the structure of that the connection terminal portions of the bus bars are arranged one after the other in the direction along the surface of the main body portion of each of the bus bars.

With the above-described construction, at the time of connecting the connection terminal portions to the electric power line portions 32, 42, respectively, the connecting operation can be executed by moving, for example, the tool or the machine in the direction, which serves as the single direction, along the surface of the main body portion. Therefore, the connecting operation can be executed without substantially changing the moving direction in the middle of the connecting operation. Furthermore, in the case where the switch devices to be connected with the connection terminal portions are arranged one after the other in the direction along the surface of the main body portion, it is possible to use the switch devices that include the component-side terminal portions, each of which has an identical projecting length. Therefore, it is possible to use the common type of switch devices as the switch devices to be installed to the battery device 10. Thus, it is not necessary to have an additional processing or adjustment with respect to the projecting length of the component-side terminal portions, and it is possible to commonize the switch devices.

The connection terminal portions of the primary bus bar and the connection terminal portions of the secondary bus bar have the connection surfaces, which extend along the surface of the main body portion and are connected with the corresponding component-side terminal portions, respectively. With this construction, the connection surfaces, which are connected with the component-side terminal portions, form the planar surfaces that are parallel to the direction along the main body portion, along which, for example, the tool or the machine is moved. Therefore, the surface areas of the joint portions, which are joined by, for example, welding, can be increased, and thereby a required joint force of the joint portions can be ensured.

The connection terminal portions of the primary bus bar and the connection terminal portions of the secondary bus bar have the connection surfaces, which extend in the crossing direction crossing the surface of the main body portion and are connected with the corresponding component-side terminal portions, respectively. With this construction, the connection surfaces, which are connected with the component-side terminal portions, form the planar surfaces that extend in the crossing direction, in which, for example, the tool or the machine is moved. Therefore, the surface areas of the joint portions, which are joined by, for example, welding, can be increased, and thereby the required joint force of the joint portions can be ensured. With this construction, the connection terminal portions do not outwardly project beyond the primary bus bar or the secondary bus bar, so that the size of the connection member can be limited, and thereby the battery device 10 can be made compact. Furthermore, with this construction, it is possible to construct such that the connection terminal portions of one of the primary bus bar and the secondary bus bar do not project toward the other one of the primary bus bar and the secondary bus bar. Therefore, it is possible to reduce the amount of processing such as bending for the connection terminal portions.

The connection terminal portions of the primary bus bar and the connection terminal portions of the secondary bus bar are placed at a position that coincides with a position of the outermost bus bar among the plurality of bus bars that include the primary bus bar and the secondary bus bar and are arranged one after the other in the perpendicular direction, which is perpendicular to the surface of the main body portion. With this construction, the connection terminal portions do not outwardly project beyond the above-described outermost bus bar, so that the size of the connection member can be limited, and thereby the battery device 10 can be made compact.

The outer covers of the switch devices are installed in a state where the outer covers of the switch devices are spaced from the circuit board 2. With this construction, the outer covers of the switch devices do not contact the circuit board 2. Therefore, it is possible to construct that the circuit board 2 is not included in the heat releasing path. In this way, the heat of the switch devices are conducted to the heat releasing members 6A, 6B without passing through the circuit board 2, which has the large thermal resistance. Therefore, the heat dissipation performance can be improved in comparison to a structure, in which the switch devices are in contact with the circuit board 2.

The switch device includes: the signal line portions 31, which conduct the electric signal; and the electric power line portions 32, which conduct the electric power. The electric power line portions 32 are connected to the input/output terminal through the bus bar 33 and are not connected to the circuit board 2. The signal line portions 31 are reed terminals projecting from the inside to the outside of the switch device and are connected to the circuit board 2. The signal line portions 31 are inserted into holes of the circuit board 2 and are welded to one of opposed surfaces of the circuit board 2 or welded to both of the opposed surfaces of the circuit board 2, so that the signal line portions 31 are connected to the circuit board 2. With this construction, the large electric current does not flow through the signal line portions 31. Thereby, large heat transfer from the signal line portions 31 to the circuit board 2 does not occur. Furthermore, the electric power line portions 32 are not connected to the circuit board 2. Therefore, the heat generated at the electric power line portions 32 is not transferred to the circuit board 2. As a result, the heat, which is generated from the electric power line portions 32, can be transferred to the heat releasing members 6A, 6B through the switch devices and can be released from the heat releasing members 6A, 6B.

In the connection member of the first embodiment, the main body portion of the primary bus bar and the main body portion of the secondary bus bar are placed one after the other and are spaced from each other in the plate thickness direction of each main body portion. The electric current terminal portions of each of the primary bus bar and the secondary bus bar respectively project from the corresponding main body portion in the common direction at the corresponding locations that are displaced from each other in the extending direction of the main body portion.

Figure 20:
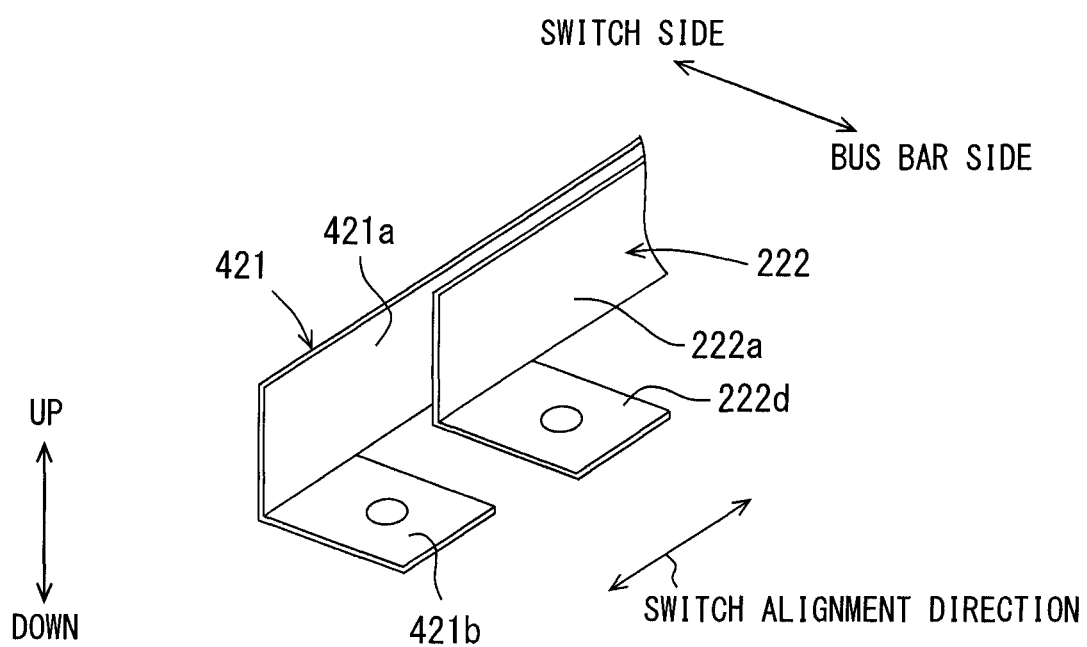
FIG. 20 is a partial enlarged view showing large-current terminal portions of bus bars of a sixth embodiment.

With this construction, the large-current terminal portion 21b and the large-current terminal portion 22d may be projected in one of a plurality of different directions like in a case of FIG. 20, in which the two main body portions are extended straight in the one direction, and a case of FIG. 3, in which the two main body portions are respectively bent in the middle. Thereby, it is possible to provide the connection member that has a high degree of freedom with respect to the installation location for the input/output terminals that are respectively connected to the large-current terminal portion 21b and the large-current terminal portion 22d.

According to the construction shown in FIG. 3, the large-current terminal portion 21b of the bus bar 21 and the large-current terminal portion 22d of the bus bar 22 respectively project from the main body portions 21a, 22a, which are arranged one after the other in the thickness direction thereof, in the common direction at the corresponding locations that are displace from each other in the extending direction of the end parts of the main body portions 21a, 22a that are bent in the middle of the main body portions 21a, 22a. With this construction, it is possible to provide the large-current terminal portion 21b and the large-current terminal portion 22d, which project in the crossing direction that crosses the alignment direction of the two main body portions, at the two bus bars that have the main body portions, respectively, which are bent in the middle.

Second Embodiment

In a second embodiment, a modification of the first embodiment will be described with reference to FIGS. 9 to 11. In each of the drawings, the constituent elements, which are indicated by the reference signs that are the same as the reference signs indicated in the drawings of the first embodiment, are the similar constituent elements and provide the same effects and advantages as those of the first embodiment. Hereinafter, differences, which are different from the first embodiment, will be described.

Figure 6:
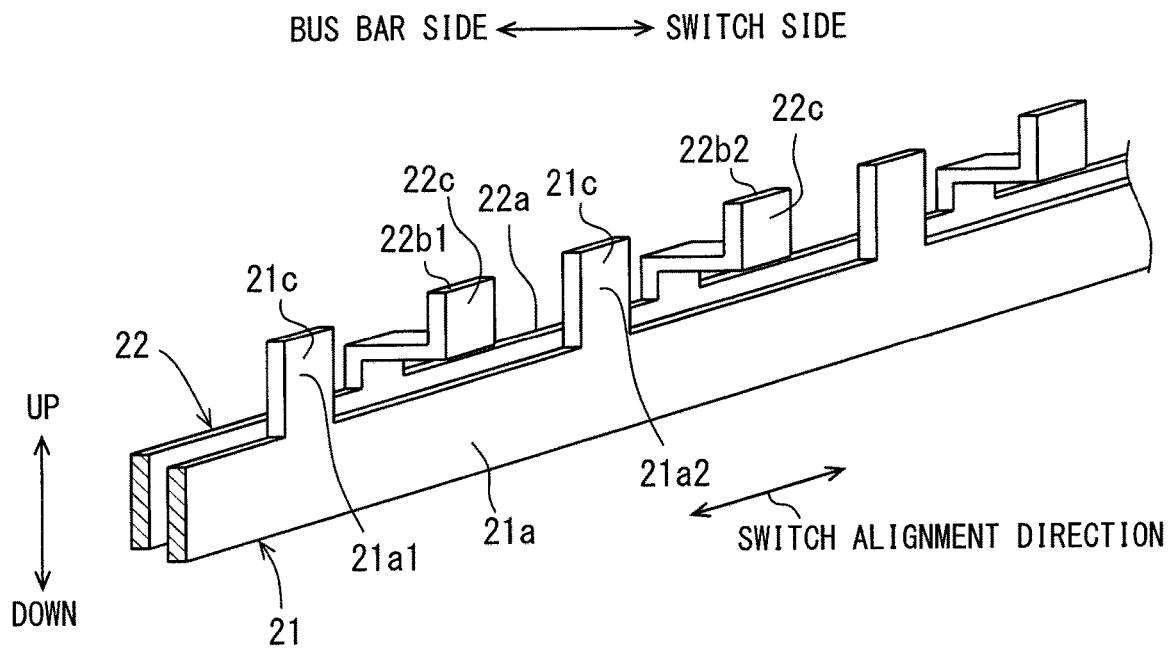
FIG. 6 is a schematic diagram showing the bus bars of the first embodiment.
Figure 9:
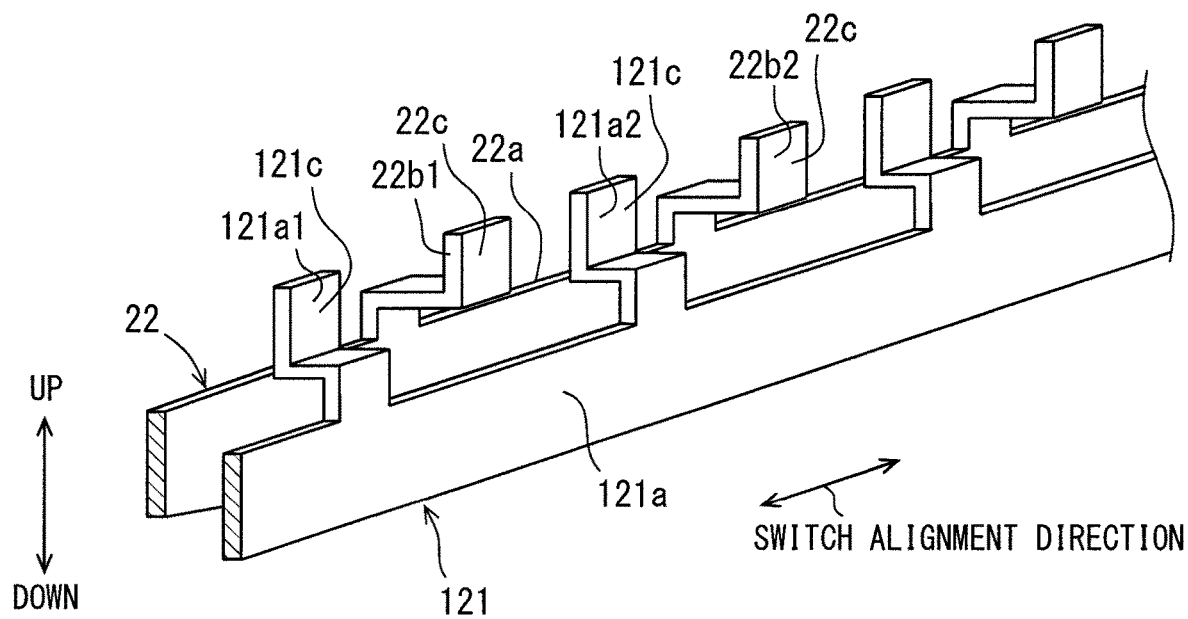
FIG. 9 is a schematic diagram showing bus bars of a second embodiment.
Figure 10:
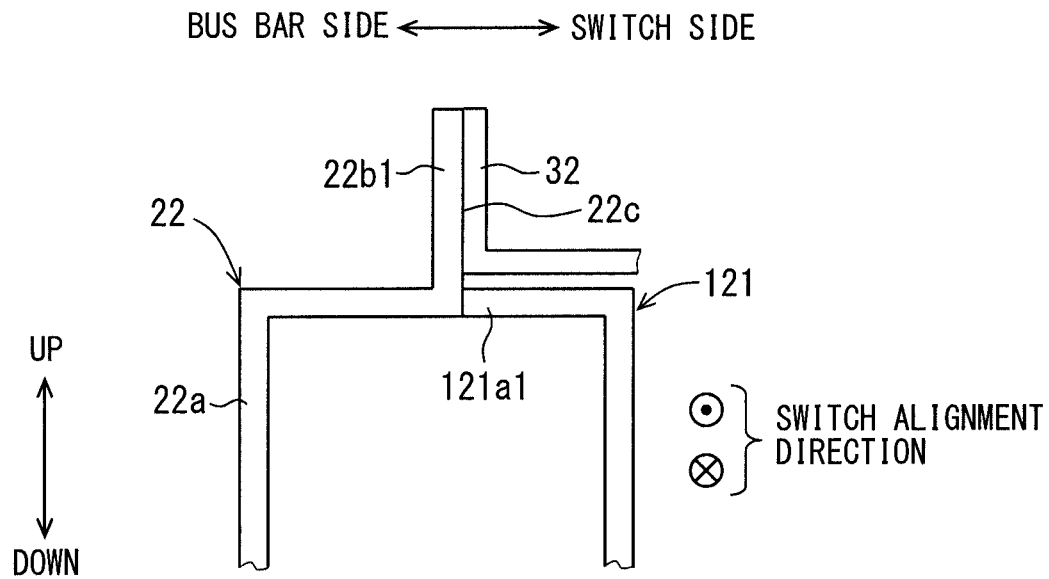
FIG. 10 is a side view showing the bus bars of the second embodiment.
Figure 11:
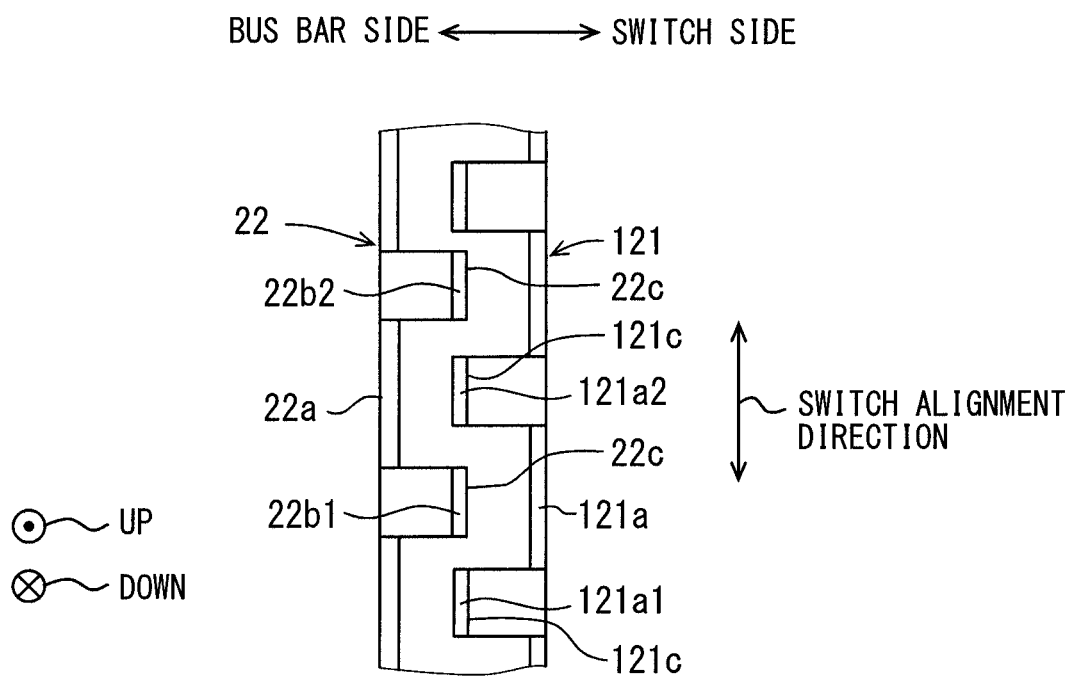
FIG. 11 is a plan view showing the bus bars of the second embodiment.

The example shown in FIGS. 9 to 11 is a modification of the first embodiment shown in FIGS. 6 to 8. There will be described the connection terminal portions of the bus bar 121 and the bus bar 22, which are arranged one after the other in the perpendicular direction that is perpendicular to the surface of the main body portion of each of the bus bar 121 and the bus bar 22. The connection terminal portions 121a1, 121a2 of the bus bar 121 and the connection terminal portions 22b1, 22b2 of the bus bar 22 are arranged one after the other in the direction along the surface of the main body portion 121a, 22a or the switch alignment direction.

The bus bar 121 differs from the bus bar 21 with respect to that the connection terminal portion 121a1 and the connection terminal portion 121a2 are distal end portions of the leg portions that project from the main body portion 121a toward the bus bar 22 and are bent in the middle. Connecting parts of the connection terminal portion 121a1 and the connection terminal portion 121a2, which are connected to the component-side terminal portions, respectively form the connection surfaces 121c, respectively, which are parallel with the connection surfaces 22c of the connection terminal portion 22b1 and the connection terminal portion 22b2 of the bus bar 22. A position of the connection surface 121c of each of the connection terminal portion 121a1 and the connection terminal portion 121a2 coincides with a position of the connection surface 22c of each of the connection terminal portion 22b1 and the connection terminal portion 22b2 in the perpendicular direction that is perpendicular to the surface of the main body portion 121a.

The connection terminal portion 121a1, the connection terminal portion 121a2, the connection terminal portion 22b1 and the connection terminal portion 22b2 are placed between the bus bar 121 and the bus bar 22 or between the main body portion 121a and the main body portion 22a in the perpendicular direction. The connection terminal portion 121a1 and the connection terminal portion 121a2 largely project beyond the main body portion 121a toward the bus bar 22 side and thereby project away from the outer covers of the power devices. The connection terminal portion 22b1 and the connection terminal portion 22b2 project beyond the main body portion 22a toward the switch side to meet the component-side terminal portions.

According to the connection member of the second embodiment, the connection terminal portions do not outwardly project beyond the primary bus bar or the secondary bus bar, so that the size of the switch devices and the connection member, which is measured in the perpendicular direction, can be limited, and thereby the battery device 10 can be made compact.

According to the second embodiment, the connection terminal portions of the primary bus bar and the connection terminal portions of the secondary bus bar are placed between the two opposite outermost bus bars among the plurality of bus bars that include the primary bus bar and the secondary bus bar and are arranged one after the other in the perpendicular direction, which is perpendicular to the surface of the main body portion. With this construction, the connection terminal portions do not outwardly project beyond the two opposite outermost bus bars, so that the size of the connection member can be limited, and thereby the battery device 10 can be made compact.

Third Embodiment

In a third embodiment, a modification of the first embodiment will be described with reference to FIGS. 12 to 14. In each of the drawings, the constituent elements, which are indicated by the reference signs that are the same as the reference signs indicated in the drawings of the previous embodiments, are the similar constituent elements and provide the same effects and advantages as those of the previous embodiments. Hereinafter, differences, which are different from the previous embodiments, will be described.

Figure 12:
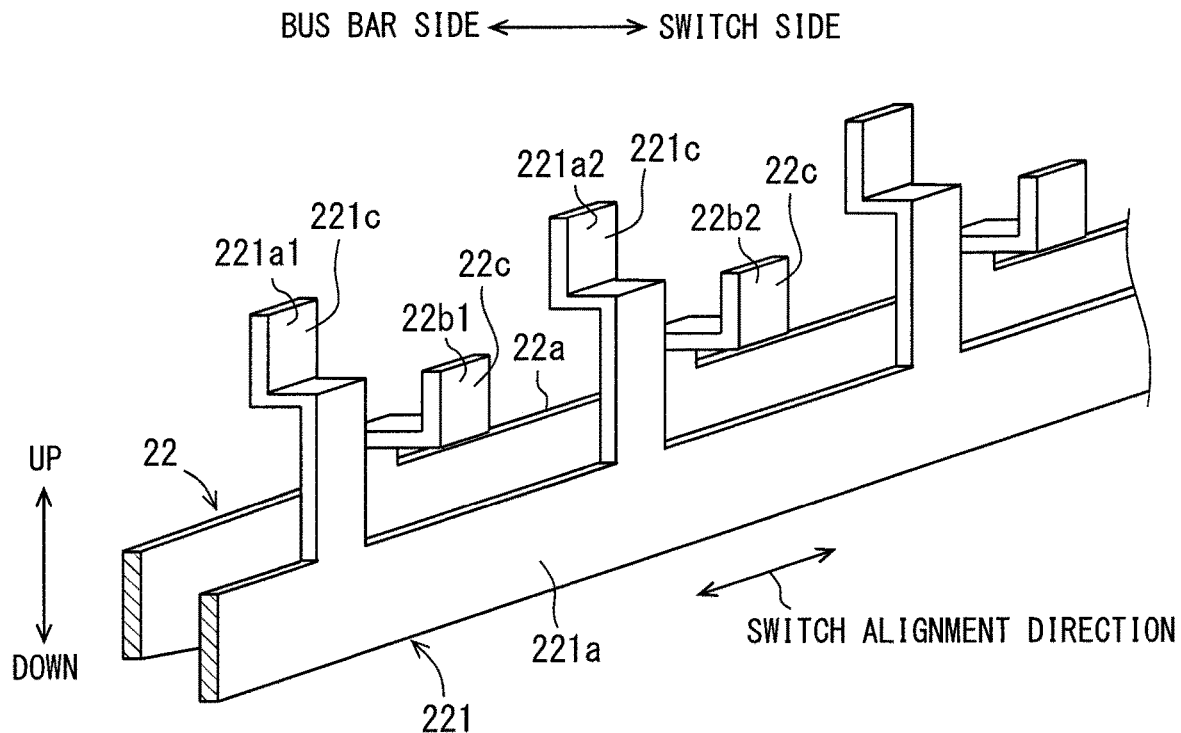
FIG. 12 is a schematic diagram showing bus bars of a third embodiment.
Figure 13:
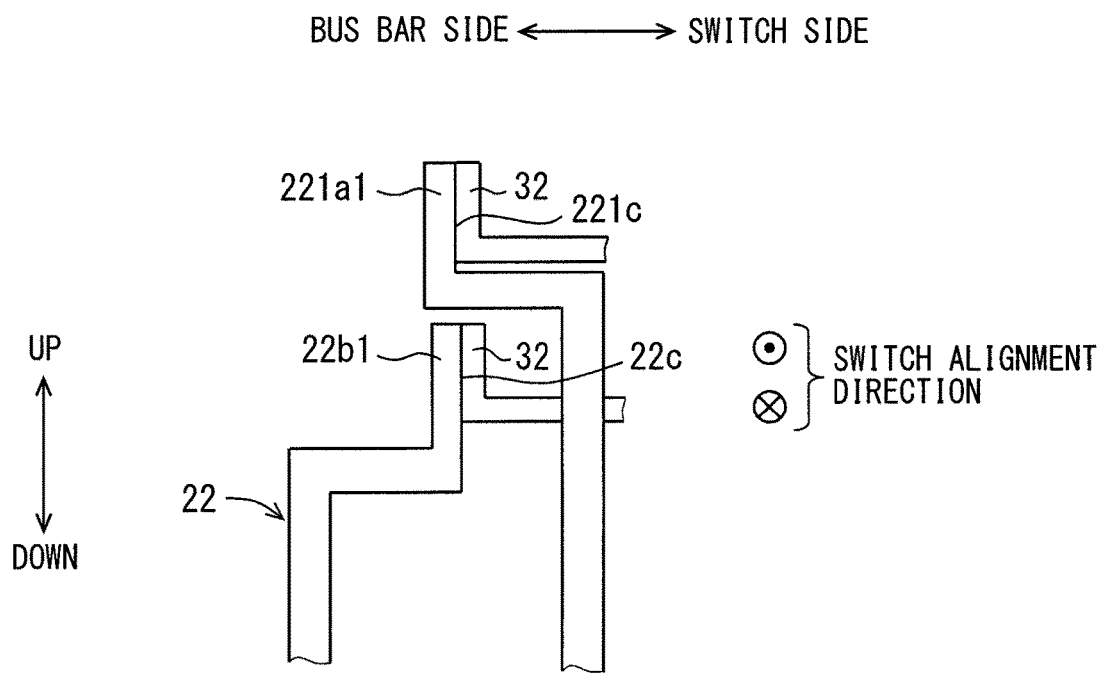
FIG. 13 is a side view showing bus bars of the third embodiment.
Figure 14:
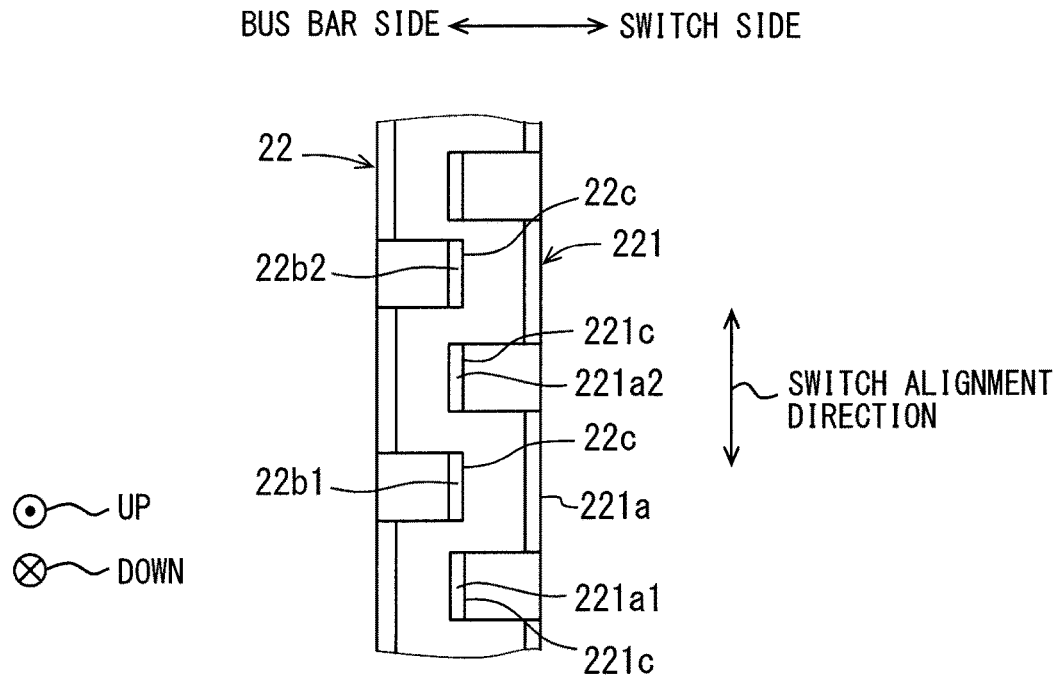
FIG. 14 is a plan view showing bus bars of the third embodiment.

The example shown in FIGS. 12 to 14 is a modification of the second embodiment shown in FIGS. 9 to 11. There will be described the connection terminal portions of the bus bar 221 and the bus bar 22, which are arranged one after the other in the perpendicular direction that is perpendicular to the surface of the main body portion of each of the bus bar 221 and the bus bar 22. The connection terminal portions 221a1, 221a2 of the bus bar 221 and the connection terminal portions 22b1, 22b2 of the bus bar 22 are arranged one after the other in the direction along the surface of the main body portion 221a, 22a or the switch alignment direction.

The bus bar 221 differs from the bus bar 121 with respect to that the connection terminal portion 221a1 and the connection terminal portion 221a2 are placed on the upper side of the connection terminal portion 22b1 and the connection terminal portion 22b2. As shown in FIG. 13, the connection terminal portion 221a1 and the connection terminal portion 221a2 are portions located on the distal end side of the leg portions that largely upwardly project in such a manner that lower ends of the connection terminal portion 221a1 and the connection terminal portion 221a2, which are connected to the component-side terminal portions, are located on the upper side of upper ends of the connection terminal portion 22b1 and the connection terminal portion 22b2. Therefore, the component-side terminal portions, which are connected to the connection terminal portion 221a1 and the connection terminal portion 221a2, are placed on the upper side of the component-side terminal portions, which are connected to the connection terminal portion 22b1 and the connection terminal portion 22b2.

Connecting parts of the connection terminal portion 221a1 and the connection terminal portion 221a2, which are connected to the component-side terminal portions, form the connection surfaces 221c, respectively, which are parallel with the connection surfaces 22c of the connection terminal portion 22b1 and the connection terminal portion 22b2 of the bus bar 22. A position of the connection surface 221c of each of the connection terminal portion 221a1 and the connection terminal portion 221a2 coincides with a position of the connection surface 22c of each of the connection terminal portion 22b1 and the connection terminal portion 22b2 in the perpendicular direction that is perpendicular to the surface of the main body portion 221a.

The connection terminal portion 221a1, the connection terminal portion 221a2, the connection terminal portion 22b1 and the connection terminal portion 22b2 are placed between the main body portion 221a of the bus bar 221 and the main body portion 22a of the bus bar 22 in the perpendicular direction. The connection terminal portion 221a1 and the connection terminal portion 221a2 project beyond the main body portion 221a toward the bus bar 22 side and upwardly project beyond the connection terminal portions of the bus bar 22. Therefore, it is possible to connect with the power devices that have the electric power line portions 32 placed at different heights.

According to the connection member of the third embodiment, the connection terminal portions do not outwardly project from the primary bus bar or the secondary bus bar, so that the size of the battery device 10, which includes the switch devices and the connection member, in the perpendicular direction, can be limited, and thereby the battery device 10 can be made compact.

According to the third embodiment, the connection terminal portions of the primary bus bar and the connection terminal portions of the secondary bus bar are placed between the two opposite outermost bus bars among the plurality of bus bars that include the primary bus bar and the secondary bus bar and are arranged one after the other in the perpendicular direction, which is perpendicular to the surface of the main body portion.

Fourth Embodiment

In a fourth embodiment, a modification of the first embodiment will be described with reference to FIG. 15. In each of the drawings, the constituent elements, which are indicated by the reference signs that are the same as the reference signs indicated in the drawings of the first embodiment, are the similar constituent elements and provide the same effects and advantages as those of the first embodiment. Hereinafter, differences, which are different from the first embodiment, will be described.

Figure 15:
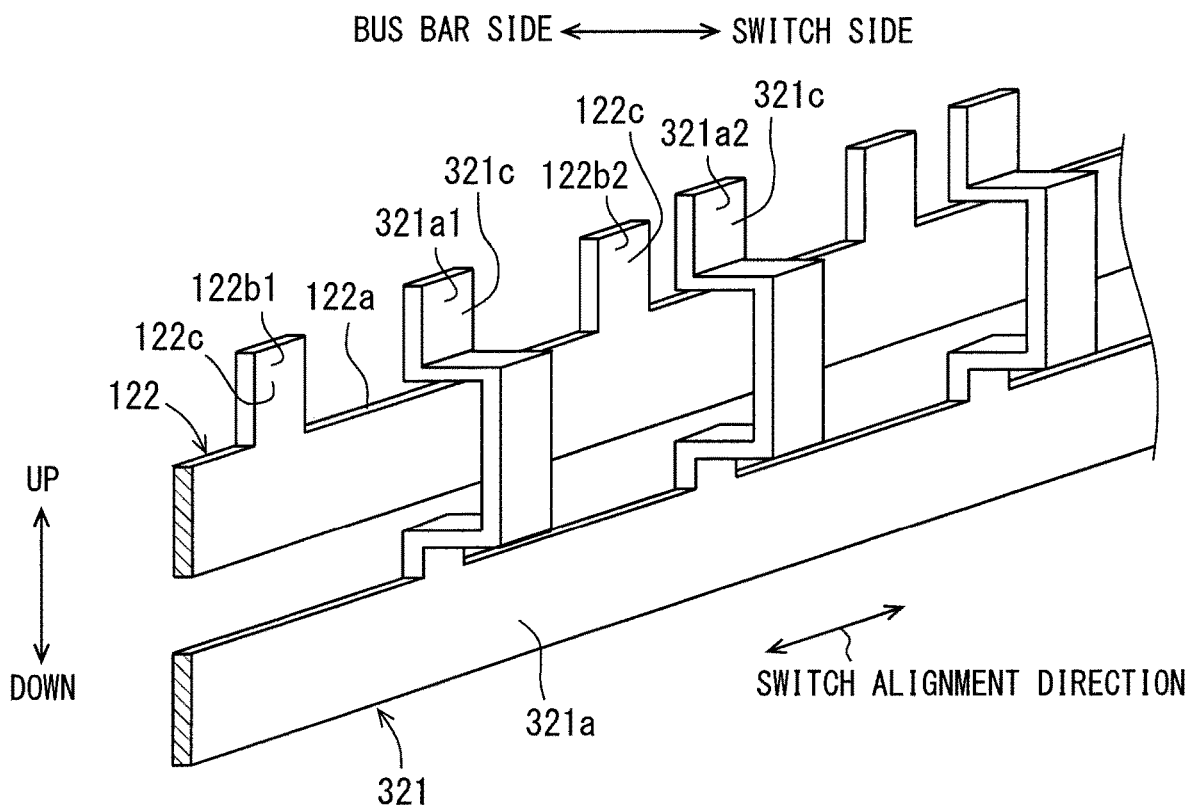
FIG. 15 is a schematic diagram showing bus bars of a fourth embodiment.

As shown in FIG. 15, in the bus bar 321 and the bus bar 122, which are placed one after the other in the perpendicular direction that is perpendicular to the surface of the main body portion, although the position of the connection terminal portions of the bus bar 321 and the position of the connection terminal portions of the bus bar 122 in the up-and-down direction are identically set, the position of the main body portion of the bus bar 321 and the position of the main body portion of the bus bar 122 in the up-and-down direction are different from each other. The bus bar 122 includes: the main body portion 122a, which is elongated in the switch alignment direction; and the connection terminal portion 122b1 and the connection terminal portion 122b2, which respectively project from the main body portion 122a. The bus bar 321 includes: the main body portion 321a, which is elongated in the switch alignment direction; and the connection terminal portion 321a1 and the connection terminal portion 321a2, which respectively project from the main body portion 321a through a bent portion that is shaped into a U-form.

The main body portion 321a is located on the lower side of the main body portion 122a, and each of the bent portions, which are respectively shaped into the U-form and respectively extend from the main body portion 321a to the corresponding connection terminal portion, has a length, which is measured in the up-and-down direction and is equal to a length of the main body portion 122a, which is measured in the up-and-down direction. The connection terminal portions 321a1, 321a2 of the bus bar 321 and the connection terminal portions 122b1, 122b2 of the bus bar 122 are arranged one after the other in the direction along the surface of the main body portion 321a, 122a or the switch alignment direction, and the position of the connection terminal portions 321a1, 321a2 of the bus bar 321 and the position of the connection terminal portions 122b1, 122b2 of the bus bar 122 in the up-and-down direction are identically set.

Connecting parts of the connection terminal portion 321a1 and the connection terminal portion 321a2, which are connected to the component-side terminal portions, form the connection surfaces 321c, respectively, which are parallel with the connection surfaces 122c of the connection terminal portion 122b1 and the connection terminal portion 122b2 of the bus bar 122. A position of the connection surface 321c of each of the connection terminal portion 321a1 and the connection terminal portion 321a2 coincides with a position of the connection surface 122c of each of the connection terminal portion 122b1 and the connection terminal portion 122b2 in the perpendicular direction that is perpendicular to the surface of the main body portion 321a.

Therefore, the connection terminal portion 321a1 and the connection terminal portion 321a2 are provided at the position that coincides with the position of the main body portion 122a and the connection terminal portions 122b1, 122b2 of the bus bar 122 in the perpendicular direction. The main body portion 321a is provided at the position that coincides with the position of the connection terminal portions 321a1, 321a2 in the perpendicular direction.

In the connection member of the fourth embodiment, the main body portion of the primary bus bar and the main body portion of the secondary bus bar are placed one after the other in the up-and-down direction at the same position in the perpendicular direction that is perpendicular to the surface of the main body portion. With this construction, it is possible to limit the size of the bus bar support member, which receives the main body portion of the primary bus bar and the main body portion of the secondary bus bar. Furthermore, with this construction, the connection terminal portions are also placed next the main body portion in the up-and-down direction. Therefore, the size of the connection member can be reduced in the perpendicular direction, and thereby the battery device 10 can be made compact.

Fifth Embodiment

In a fifth embodiment, a modification of the second embodiment will be described with reference to FIG. 16. In each of the drawings, the constituent elements, which are indicated by the reference signs that are the same as the reference signs indicated in the drawings of the first embodiment, are the similar constituent elements and provide the same effects and advantages as those of the first embodiment. Hereinafter, differences, which are different from the second embodiment, will be described.

Figure 16:
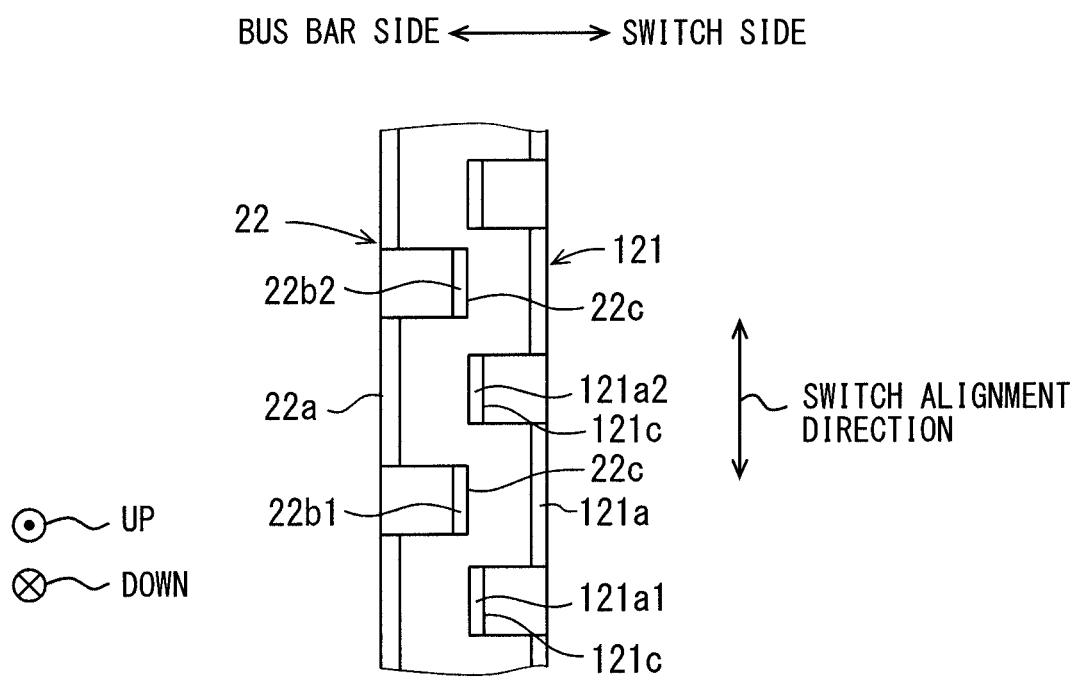
FIG. 16 is a plan view of bus bars of a fifth embodiment.

As shown in FIG. 16, a position of the connection surface 121*c* of each of the connection terminal portion 121*a*1 and the connection terminal portion 121*a*2 is displaced by an amount, which generally corresponds to a plate thickness of the bus bar 121, 22, from a position of the connection surface 22*c* of each of the connection terminal portion 22*b*1 and the connection terminal portion 22*b*2 in the perpendicular direction that is perpendicular to the surface of the main body portion 121*a*. Even in the construction of the fifth embodiment, the connection terminal portions of the primary bus bar and the connection terminal portions of the secondary bus bar are arranged one after the other in the direction along the surface of the main body portion 121*a*. The construction of the fifth embodiment, in which the position of the connection surface of each of the connection terminal portions of the primary bus bar is displaced from the position of the connection surface of each of the connection terminal portions of the secondary bus bar by the amount corresponding to the plate thickness, is also applicable to the primary bus bar and the secondary bus bar of the other embodiments, which are other than the second embodiment.

Sixth Embodiment

In a sixth embodiment, the bus bars 421, 222, which are modification of the bus bars 21, 22 of the first embodiment, will be described with reference to FIG. 20. The bus bar 421, which serves as the primary bus bar, and the bus bar 222, which serves as the secondary bus bar, are substantially identical to the bus bar 21 and the bus bar 22 of the first embodiment to provide the same functions and the same advantages except the structure shown in FIG. 20. Hereinafter, differences, which are different from the first embodiment, will be described.

As shown in FIG. 20, the large-current terminal portion 421*b* of the bus bar 421 and the large-current terminal portion 222*d* of the bus bar 222 respectively project in the common direction from the main body portions 421*a*, 222*a* at the corresponding locations, respectively, which are displace from each other in the extending direction of each main body portion 421*a*, 222*a* while the main body portions 421*a*, 222*a* are arranged one after the other in the plate thickness direction. The extending direction of the main body portion 421*a* and the extending direction of the main body portion 222*a* coincide with a single direction that is also referred to as the switch alignment direction. The large-current terminal portion 421*b* and the large-current terminal portion 222*d* correspond to the large-current terminal portion 21*b* and the large-current terminal portion 22*d*, respectively. The main body portion 421*a* and the main body portion 222*a* correspond to the main body portion 21*a* and the main body portion 22*a*, respectively.

According to the sixth embodiment, the main body portion 421*a* of the primary bus bar and the main body portion 222*a* of the secondary bus bar are arranged one after the other and are spaced from each other in the plate thickness direction. The large-current terminal portion 421*b* of the primary bus bar and the large-current terminal portion 222*d* of the secondary bus bar respectively project in the common direction from the main body portions 421*a*, 222*a* at the corresponding locations, which are displace from each other in the extending direction of main body portion 421*a*, 222*a*. With this construction, in the case where the two main body portions are extended in the one direction, the large-current terminal portion 21*b* and the large-current terminal portion 22*d*, which respectively project from the main body portions in the alignment direction of the main body portions, can be provided.

Other Embodiment

The present disclosure should not be limited to the embodiments described above. The present disclosure should cover the above embodiments and modifications thereof, which should be implemented by a skilled person. For example, the present disclosure can be implemented in various ways without being limited to the combinations of the components and the elements described in the above embodiments. The present disclosure may be implemented by various combinations. The present disclosure may include additional portions that can be added to the above embodiment(s). The present disclosure should cover modifications of the above embodiment(s), from which the component(s) and/or the element(s) of the above embodiment(s) is/are eliminated. The present disclosure should cover replacement or combination of the component(s) and/or the element(s) of one of the embodiments with component(s) and/or the element(s) of another one or more of the embodiments. The technical scope of the present disclosure should not be limited to the disclosure of the above embodiments.

In the above embodiments, each of the switch devices, which are connected to the bus bars, may be replaced with a component, such as a fuse, a resistor, or a capacitor, which is categorized as the electric component.

In the above embodiments, the joint between each component-side terminal portion and the corresponding connection terminal portion may be made by: crimping; a fixing structure using a screw, or a bolt and a nut; fusion bonding, such as TIG welding; laser welding; or solid-state welding, such as resistance welding. In the case of performing the TIG welding, oxygen-free copper is desirably used as a material of at least one of the members in order to limit hot crack.

Figure 17:
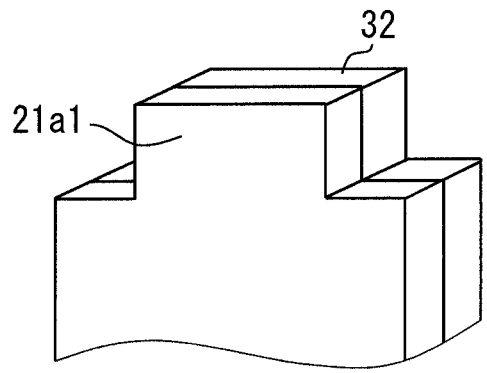
FIG. 17 is a diagram showing a first example of another configuration of an electric power line portion and a terminal of the bus bar.
Figure 18:
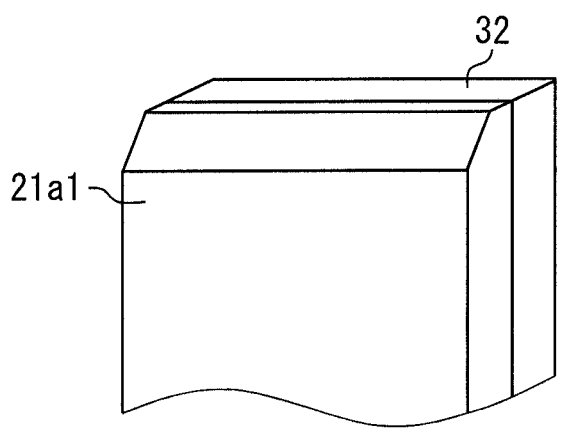
FIG. 18 is a diagram showing a second example of the other configuration of the electric power line portion and the terminal of the bus bar.
Figure 19:
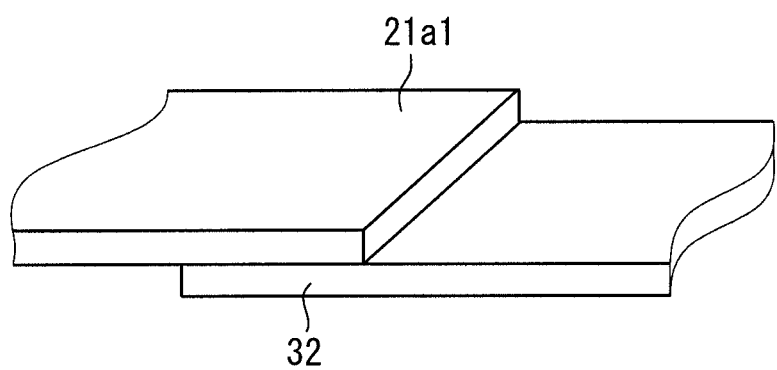
FIG. 19 is a diagram showing a third example of the other configuration of the electric power line portion and the terminal of the bus bar.

The shapes of the distal end parts of, for example, the electric power line portion (serving as the component-side terminal portion) 32 and the connection terminal portion 21*a*1 may be a projecting form shown in FIG. 17 besides the flat form. Furthermore, the shapes of the distal end parts of, for example, the electric power line portion (serving as the component-side terminal portion) 32 and the connection terminal portion 21*a*1 may be such that the distal end part of the one of the electric power line portion 32 and the connection terminal portion 21a1 is chamfered, as shown in FIG. 18. In these cases, a location of, for example, the welding is a connection between the two portions. Furthermore, the opposing direction of the two portions may be, for example, the transverse direction or the up-and-down direction. The connecting method of, for example, the electric power line portion (serving as the component-side terminal portion) 32 and the connection terminal portion 21a1 may be a method of executing, for example, the TIG welding from the surface of the one of the electric power line portion 32 and the connection terminal portion 21a1 in a state where the surface of the electric power line portion 32 and the surface of the connection terminal portion 21a1 contact with each other, as shown in FIG. 19.

The primary bus bar(s) and the secondary bus bar(s) of the present disclosure should not be limited by the combination of the bus bars and the number of the bus bars recited in the present description. For example, the number of the bus bars, which are arranged one after the other in the direction perpendicular to the main body portion, may be three or more.

The leg portions of the primary bus bar and the secondary bus bar described in the above embodiments are shaped into the bent form. Alternatively, the leg portions of the primary bus bar and the secondary bus bar may be shaped into a curved form.

The primary bus bar and the secondary bus bar of the above embodiments may have different plate thicknesses, respectively. The connection terminal portions of the primary bus bar and the connection terminal portions of the secondary bus bar of the above embodiments may be different from each other with respect to the plate thickness and/or the size in the alignment direction.

The power devices of the above embodiments may be respectively replaced with a mechanical relay that does not includes a semiconductor device and controls input and output of an electric power relative to a battery. The mechanical relay is a switch device that includes, for example, a coil and contacts and controls the input and output of the electric power through implementation of a state where the flow of the electric power is enabled by closing the contacts. In the case of the mechanical relay, the outer cover of the mechanical relay is in a form of a rectangular parallelepiped case made of, for example, resin. The signal line portions 31 and the electric power line portions 32 project to the outside of the case, as discussed above. As discussed above, the switch devices of the present disclosure may include, for example, the power devices and/or the mechanical relays.

In the above embodiments, the cells, which form the external battery 17 and the assembled battery 13, may be a nickel hydrogen secondary battery or an organic radical battery besides the lead-acid battery or the lithium ion secondary battery described in the first embodiment.

The cells of the battery device according to the above embodiments may be respectively configured such that the exterior-cover case of the cell is shaped into a thin flat plate form and is made of a laminate sheet. The laminate sheet is made of dielectric material. In this case, each cell has an internal space in a flat container that is produced by thermally fusing two end parts of the laminate sheet, which is folded in half, to seal between the two end parts of the laminate sheet. This internal space receives a battery main body that includes an electrode assembly, electrolyte, terminal connecting portions, a part of a positive electrode terminal portion, and a part of a negative electrode terminal portion. Therefore, in the cell, a peripheral portion of the flat container is sealed, so that the battery main body is accommodated in a sealed state inside the flat container. The cell has a pair of electrode terminals that are pulled out from the flat container.

In the above embodiments, for example, cells, each of which has a cylindrical outer shape, may be used as the cells of the battery device.

In the above embodiments, the battery of the battery device may be formed by a single cell or a plurality of cells. The plurality of cells may be stacked in the up-and-down direction or may be stacked side by side in the transverse direction.

The invention claimed is:

1. A connection member comprising
a primary bus bar and a secondary bus bar, each of which includes a main body portion and a plurality of connection terminal portions that are each formed integrally and as one-piece with the main body portion and that each have a connection surface configured to be joined to a corresponding component-side terminal portion of a corresponding one of a plurality of electric components, wherein
the primary bus bar and the secondary bus bar are arranged one after another in a perpendicular direction that is perpendicular to a surface of the main body portion of each of the primary bus bar and the secondary bus bar, at least one of the primary bus bar and the secondary bus bar including a bent leg portion extending in the perpendicular direction and connecting the main body portion of the at least one of the primary bus bar and the secondary bus bar to a corresponding one of the plurality of connection terminal portions,
(i) the connection surfaces of the plurality of connection terminal portions of the primary bus bar and the connection surfaces of the plurality of connection terminal portions of the secondary bus bar are coplanar with each other,
(ii) the connection surfaces of the plurality of connection terminal portions of the primary bus bar and the connection surfaces of the plurality of connection terminal portions of the secondary bus bar are parallel to the surface of the main body portion of each of the primary bus bar and the secondary bus bar, and
(iii) the connection surfaces of the plurality of connection terminal portions of the primary bus bar and the connection surfaces of the plurality of connection terminal portions of the secondary bus bar are alternately arranged in a crossing direction that is perpendicular to the perpendicular direction.

2. The connection member according to claim 1, wherein the connection surfaces of the plurality of connection terminal portions of the primary bus bar or the connection surfaces of the plurality of connection terminal portions of the secondary bus bar are placed at a position that coincides with a position of the primary bus bar or a position of the secondary bus bar in the perpendicular direction.

3. The connection member according to claim 1, wherein the connection surfaces of the plurality of connection terminal portions of the primary bus bar and the connection surfaces of the plurality of connection terminal portions of the secondary bus bar are placed between the primary bus bar and the secondary bus bar in the perpendicular direction.

4. The connection member according to claim 1, wherein the connection surfaces of the plurality of connection terminal portions of the primary bus bar and the connection surfaces of the plurality of connection terminal portions of the secondary bus bar are placed between two opposite outermost bus bars among a plurality of bus bars that include the primary bus bar and the secondary bus bar and are arranged one after another in the perpendicular direction.

5. The connection member according to claim 1, wherein:
the primary bus bar includes an electric current terminal portion, through which an electric current is inputted or outputted to the main body portion of the primary bus bar;
the secondary bus bar includes an electric current terminal portion, through which the electric current is inputted or outputted to the main body portion of the secondary bus bar;
the main body portion of the primary bus bar and the main body portion of the secondary bus bar are arranged one after another and are spaced from each other in a plate thickness direction of each of the main body portion of the primary bus bar and the main body portion of the secondary bus bar; and
the electric current terminal portion of the primary bus bar and the electric current terminal portion of the secondary bus bar project in a common direction at a corresponding position of the main body portion of the primary bus bar and a corresponding position of the main body portion of the secondary bus bar, respectively, which are displaced from each other in an extending direction of each of the main body portion of the primary bus bar and the main body portion of the secondary bus bar.

6. The connection member according to claim 1, wherein the plurality of electric components is a plurality of semiconductor switching devices that control input and output of an electric power relative to a battery.

7. The connection member according to claim 1, wherein the connection surfaces of the plurality of connection terminal portions of the primary bus bar and the connection surfaces of the plurality of connection terminal portions of the secondary bus bar are perpendicular to the perpendicular direction in which the primary bus bar and the secondary bus bar are arranged one after another.

8. The connection member according to claim 1, wherein:
the surface of the main body portion of each of the primary bus bar and the secondary bus bar is a main surface; and
for each of the primary bus bar and the second bus bar, the plurality of connection terminal portions extend from a side surface that is perpendicular to the main surface.

9. An electric component unit comprising:
the connection member of claim 1; and
the plurality of the electric components, each of which includes the component-side terminal portion connected to the corresponding connection surface.

10. The electric component unit according to claim 9, comprising a bus bar receiving case that receives the primary bus bar and the secondary bus bar such that the primary bus bar and the secondary bus bar are arranged one after another in the perpendicular direction that is perpendicular to the surface of the main body portion of each of the primary bus bar and the secondary bus bar.

11. A battery device comprising:
the electric component unit of claim 9; and
a secondary battery.

\* \* \* \* \*